US 8,075,951 B2

(12) United States Patent
Hammond-Cunningham et al.

(10) Patent No.: US 8,075,951 B2
(45) Date of Patent: Dec. 13, 2011

(54) CARBON-POLYMER ELECTROCHEMICAL SYSTEMS AND METHODS OF FABRICATING THEM USING LAYER-BY-LAYER TECHNOLOGY

(75) Inventors: Paula T. Hammond-Cunningham, Newton, MA (US); Tarek R. Farhat, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 12/433,508

(22) Filed: Apr. 30, 2009

(65) Prior Publication Data
US 2009/0269491 A1    Oct. 29, 2009

Related U.S. Application Data

(62) Division of application No. 10/944,455, filed on Sep. 17, 2004, now abandoned.

(51) Int. Cl.
*B05D 5/00* (2006.01)
(52) U.S. Cl. ......... 427/243; 427/245; 427/247; 427/402
(58) Field of Classification Search .................. 427/243, 427/245, 247, 402
See application file for complete search history.

(56) References Cited

U.S. PATENT DOCUMENTS

| | | | |
|---|---|---|---|
| 3,628,925 A * | 12/1971 | Milner | 431/4 |
| 4,877,694 A | 10/1989 | Solomon et al. | |
| 5,246,582 A | 9/1993 | Sluma et al. | |
| 5,403,675 A | 4/1995 | Ogata et al. | |
| 5,948,465 A * | 9/1999 | Blanchet-Fincher et al. | 427/77 |
| 7,414,088 B1 * | 8/2008 | Ford et al. | 524/495 |
| 2002/0071915 A1 | 6/2002 | Schubert et al. | |
| 2003/0039742 A1 | 2/2003 | Qiu et al. | |
| 2003/0124368 A1 | 7/2003 | Lynn et al. | |
| 2003/0157260 A1 | 8/2003 | Rubner et al. | |
| 2003/0228523 A1 | 12/2003 | DeLongchamp et al. | |
| 2004/0023317 A1 * | 2/2004 | Motamedi et al. | 435/14 |
| 2004/0044100 A1 * | 3/2004 | Schlenoff et al. | 523/206 |

FOREIGN PATENT DOCUMENTS

DE    3447463 C1    1/1986

OTHER PUBLICATIONS

International Search Report dated Sep. 5, 2006.

* cited by examiner

*Primary Examiner* — Elena T Lightfoot
(74) *Attorney, Agent, or Firm* — Foley Hoag LLP

(57) ABSTRACT

One aspect of the invention provides ion-exchange and gas-diffusion membranes, fabricated by a layer-by-layer approach, for use, e.g., in electrochemical cells; a process for making membrane electrode assemblies fabricated using porous frameworks, LBL composite membranes and LBL carbon-Polymer electrodes; and the application of the membrane and electrode assemblies to a variety of devices, both electrochemical and otherwise.

12 Claims, 13 Drawing Sheets

(A)

(B) (C)

(A)

(B)

(C)

(A)

(B)

(A)

(B)

(C)

(A)

(B)

(A)

(B)

CARBON-POLYMER ELECTROCHEMICAL SYSTEMS AND METHODS OF FABRICATING THEM USING LAYER-BY-LAYER TECHNOLOGY

RELATED APPLICATIONS

This application is a divisional of U.S. application Ser. No. 10/944,455, filed Sep. 17, 2004, the contents of which are hereby incorporated by reference.

GOVERNMENT SUPPORT

This invention was made with support from the National Science Foundation (grant number CTS-0136029); therefore, the government has certain rights in the invention.

BACKGROUND OF THE INVENTION

Electrochemical cells in which a chemical reaction is forced by adding electrical energy are called electrolytic cells. Central to the operation of any cell is the occurrence of oxidation and reduction reactions which produce or consume electrons. These reactions take place at electrode/solution interfaces, where the electrodes must be good electronic conductors. In operation, a cell is connected to an external load or to an external voltage source, and electric charge is transferred by electrons between the anode and the cathode through the external circuit. To complete the electric circuit through the cell an additional mechanism must exist for internal charge transfer. This is provided by one or more electrolytes, which support charge transfer by ionic conduction. Electrolytes must be poor electronic conductors to prevent internal short circuiting of the cell.

The simplest electrochemical cell consists of at least two electrodes and one or more electrolytes. The electrode at which the electron producing oxidation reaction occurs is the anode. The electrode at which an electron consuming reduction reaction occurs is called the cathode. The direction of the electron flow in the external circuit is always from anode to cathode.

A typical electrochemical cell will have a positively charged anode and a negatively charged cathode. The anode and cathode are typically submerged in a liquid electrolytic solution which may be comprised of water and certain salts, acids or base materials. Generally speaking, the anode and cathode are made of substrate materials such as titanium, graphite, or the likes coated with a catalyst such as lead dioxide or other known materials. The selection of a substrate and catalyst is determined by the particular electrode reactions which are to be optimized in a given situation.

The cathode and anode are positioned within the electrolytic cell with electrical leads leading to the exterior. The cell may be provided with appropriate plumbing and external structures to permit circulation of the electrolyte to a separate heat exchanger. Suitable inlet and outlet passages may also be provided in the cell head space to permit the withdrawal of the gases evolved from the cathode (if gases are to be evolved) and from the anode.

In order to maintain or reduce the temperature of the cell electrodes, heat exchange passages may be provided within the electrode structures. These coolant passages are connected to external sources of coolant liquid which can be circulated through the electrodes during the electrolysis process in order to maintain or reduce their temperatures.

In order to drive the electrolysis reactions it is necessary to apply electric power to the cell electrodes. The electrodes are connected through the electrical leads to an external source of electric power with the polarity being selected to induce the electrolyte anion flow to the anode and the cation flow to the cathode.

Layer-by-Layer (LBL) Technique

Organic thin films continue to attract great interest in the materials science community due to their ease of processing, ease of functionalization, light weight and flexibility. Significant progress has been achieved in the past 10-20 years, presenting the possibility of molecular-level control in molecular and macromolecular composite films. The ionic, layer-by-layer assembly technique, introduced by Decher in 1991, is among the most exciting recent developments in this area. Makromol. Chem., Macromol. Symp. 1991, 46, 321; Ber. Bunsenges. Phys. Chem. 1991, 95, 1430; Thin Solid Films 1992, 210/211, 831. This approach, which utilizes electrostatic interactions between oppositely charged polyion species to create alternating layers of sequentially adsorbed polyions, provides a simple and elegant means of depositing layer-by-layer sub-nanometer-thick polymer films onto a surface using aqueous solutions. Crystallography Reports 1994, 39, 628; Macromol. 1995, 28, 7107; Langmuir 1997, 13, 2171. This layer-by-layer deposition process provides a means to create polycation-polyanion polyelectrolyte multilayers one molecular layer at a time, thereby allowing an unprecedented level of control over the composition and surface functionality of these interesting materials. Typically, alternate layers of positively and negatively charged polymers are sequentially adsorbed onto a substrate from dilute solution to build up interpenetrated multilayer structures. Most studies have focused on polyelectrolytes in their fully charged state, such as strong polyelectrolyte poly(styrene sulfonate) (SPS). However, we have discovered unique properties when at least one alternating layer in the polyelectrolyte multilayer is a weak polyelectrolyte where the charge density along the chain can be readily controlled by adjusting the pH values of the polyelectrolyte solution. Thin Solid Films 1992, 210, 831.

More recently, applications have been extended to electroluminescent LEDs, conducting polymer composites, and as the assembly of proteins and metal-nanoparticle systems. Adv. Mater. 1995, 7, 395; Adv. Mat. 1998, 10, 1452; Thin Solid Films 1994, 244, 985; Thin Solid Films 1994, 244, 806; J. Am. Chem. Soc. 1995, 117, 6117. The electrostatic LBL technique has been extended to include many charged systems other than polymers and even other complexation mechanisms, such as hydrogen bonding. Chem. Lett. 1997, 125; Macromol. 1997, 30, 2717.

Solid Polymer Electrolytes (SPEs)

As mentioned above, all electrochemical systems consist of electrodes separated by an electrolyte for ion conduction and a load for electronic conduction, as electricity can be generated or fed into the system. Early electrochemistry relied exclusively on liquid electrolytes, but recent applications are more demanding. Solid polymer electrolytes (SPEs) have replaced liquid electrolytes in many high-performance applications, such as batteries, fuel cells, sensors, and electrochromic devices. Compared to liquid electrolytes, SPEs feature easier processing, enhanced chemical compatibility, and better mechanical properties with only a modest decrease in conductivity.

A major advantage gained from forming SPEs by the LBL technique is the introduction of a large number of variables that modify the electrolyte or the electrodes depending on the user's application. Other advantages include the utilization of cheap nontoxic polyelectrolyte materials, an economic and simple fabrication process, and miniaturization of the electrochemical components. For example, a composite membrane made by LBL deposition of a poly(+)/poly(−) couple on a porous framework is more than ten times cheaper than any common commercial proton-exchange-membrane (PEM), yet it can deliver more than half the power. In addition, a stainless steel composite electrode made by LBL deposition of a colloid of platinum/carbon catalyst with a poly(−)/poly (+) stabilizers acted similar to a pure platinum electrode by furnishing the same open-circuit potential yet it is a thousand times cheaper and, unlike solid platinum, allows the conduction of ions.

Fabrication of Fuel Cells Via LBL

A fuel cell is a type of electrical energy generating device. There are several types of fuel cells such as acid fuel cells, molten carbonate fuel cells, solid polymer electrolyte fuel cells and solid oxide fuel cells. A fuel cell is an apparatus for continually producing electric current by electrochemical reaction of a fuel with an oxidizing agent. More specifically, a fuel cell is a galvanic energy conversion device that chemically converts a fuel such as hydrogen or a hydrocarbon and an oxidant that catalytically react at electrodes to produce a DC electrical output. In one type of fuel cell, the cathode material defines passageways for the oxidant and the anode material defines passageways for fuel. An electrolyte separates the cathode material from the anode material. The fuel and oxidant, typically as gases, are continuously passed through the cell passageways for reaction. The essential difference between a fuel cell and a battery is that there is a continuous supply of fuel and oxidant from outside the fuel cell. Fuel cells produce voltage outputs that are less than ideal and decrease with increasing load (current density). Such decreased output is in part due to the ohmic losses within the fuel cell, including electronic impedances through the electrodes, contacts and current collectors. A need therefore exists for fuel cells which have reduced ohmic losses.

Recently, industrial nations have revived the usage of alternative energy sources to address their energy problems. At the forefront of alternative energy technologies are fuel cells which consume hydrogen or methanol, rather than crude oil, to generate electricity. Larminie, J.; Dicks, A. Wiley, New York 2000. Although fuel cell technologies are relatively well known, there is a strong need for more portable, lightweight and low-cost fuel cell devices for portable devices, micropower applications, and new applications requiring embedded power in textiles, paper, plastics and other thin film geometries. Using the layer-by-layer (LBL) self-assembly a new generation of fuel cells can be envisioned. Decher, G.; Hong, J. D.; Schmitt, J. Thin Solid Films 1992, 210/211, 831-835; Arys, X.; Jonas, A. M.; Laschewsky, A.; R., L. 2000, 505-564. Micro fuel cells assembled using the LBL technology, are fundamentally different from those described in the literature. Most authors use expensive lithographic and sputtering techniques to fabricate a large number of microelectrodes on a flat substrate and use conventional PEMs as separators. However, micropatterned LBL fuel cells would provide access to low cost, readily available, and easily mass-produced micropower devices analogous to, but much cheaper than, the traditional microelectronic processes. Such systems might include the use of an ultrathin perm-selective membrane on a porous, ionically transmissive support. A major advantage of PEMs over classical membranes is that extremely thin films can effectively reduce the flow of specific gases, while maintaining a high flux of others. Krasemann, L.; Tieke, B. Journal of Membrane Science 1998, 150, 23-30; Krasemann, L.; Tieke, B. Material Science and Engineering 1999, 819, 513-519; Krasemann, L.; Tieke, B. Mat. Sc. Eng. C-Bio S89 1999, 513-518; Krasemann, L.; Tieke, B. Langmuir 2000, 16, 287; Krasemann, L.; Tieke, B. Chem. Eng. Tech. 2000, 2, 211-213. With a typical thickness per layer pair of about 1.0 to about 100 nm, it is possible to engineer a broad range of systems which will act as effective components in proton exchange membranes. Krasemann, L.; Tieke, B. Journal of Membrane Science 1998, 150, 23-30; Levasalmi, J. M.; McCarthy, T. J. Macromolecules 1997, 30, 1752.

The core of a fuel cell is the membrane-electrode assembly (MEA). The MEA of a fuel cell is usually fabricated by sandwiching a proton-exchange membrane (PEM) between two gas diffusion C/Pt electrodes. Larminie, J.; Dicks, A. Wiley, New York 2000; Gottesfield, S.; Zawodzinski, T. Adv. Electrochem. Sci. Eng. 1997, 5, 195-301. The most commonly used PEMs are the perfluorosulfonated membranes (e.g., Nafion®) which are comprised of a PTFE crosslinked hydrophobic backbone impregnated with hydrophilic sulfonic acid sites needed for proton mobility. Larminie, J.; Dicks, A. Wiley, New York 2000; Gottesfield, S.; Zawodzinski, T. Adv. Electrochem. Sci. Eng. 1997, 5, 195-301; Mehta, V.; Cooper, J. S. J. Power Sources 2003, 114, 32-53. Other types of membranes used as PEMs are the hydrocarbon polymer, non-fluorinated, and polymer-inorganic composite membranes that, in general, are less expensive and recyclable. Glipa, X.; Hograth, M. Dept. of Trade and Industry (UK) homepage 2001; Panero, S.; Ciuffa, F.; D'Epifano, A.; Scrsati, B. Electrochim. Acta 2003, 48, 2009-2014; Rikukawa, M.; Sanui, K. Prog. Polym. Sci. 2000, 25, 1463-1502. Some polymers such as the polyphosphazenes, the polybenzimidazoles (PBI) and zirconia-polymer gels exhibit an equal or better performance than the conventional perfluorinated membranes, especially for water retention at high temperature. Qunhui, G.; Pintauro, P. N.; Tang, H.; O'Connor, S. J. Mem. Sci. 1999, 154, 175-181; Glipa, X.; Bonnet, B.; Mula, B.; Jones, D. J.; Rozier, J. J. Mater. Chem. 1999, 9, 3045-3049; Alberti, G.; Casciola, M. Solid State Ionics 2003, 145, 3-16. However, it should be noted that the polyphosphazenes and the zirconia-polymer gels are not commercially available and the PBIs are relatively expensive. An emerging membrane technology based on the layer-by-layer deposition of polyelectrolytes multilayer films on solid substrates or detachable films might be harnessed to perform like a classical PEM. Decher, G.; Hong, J. D.; Schmitt, J. Thin Solid Films 1992, 210/211, 831-835; Dubas, S. T.; Farhat, T. R.; Schlenoff, J. B. J. Am. Chem. Soc. 2001, 123, 5368-5369; Vazquez, E.; Dewitt, D. M.; Lynn, D. M.; Hammond, P. T. J. Am. Chem. Soc. 2003, 125, 11452; Arys, X.; Jonas, A. M.; Laschewsky, A.; R., L. 2000, 505-564.

Because the LBL films can be tailored to deposit any polyelectrolyte (PE) couple to any desired thickness, ranging from a few angstroms to a few microns, they are much less expensive technology than conventional membranes. Ion permeability and ion conductivity in LBL films have been extensively studied and characterized. Krasemann, L.; Tieke, B. Langmuir 2000, 16, 287; Farhat, T. R.; Schlenoff, J. B. Langmuir 2001, 17, 1184-1192; Farhat, T. R.; Schlenoff, J. B. J. Am. Chem. Soc. 2003, 125, 4627-4636; Harris, J. J.; DeRose, P. M.; Bruening, M. L. J. Am. Chem. Soc. 1999, 121, 1978; DeLongchamp, D. M.; Hammond, P. T. Chem. Mater. 2003, 15, 1165-1173; DeLongchamp, D. M.; Hammond, P. T. Abstr. Pap. Am. Chem. Soc. S22:136-PMSE, Part 2 2001. The diffusion coefficient of ions of conventional polymer multilayers is a few orders of magnitude lower than the classical ion exchanger membranes hence their proton conduction is lower. However, a range of multilayer systems which incorporate hydrophilic polymers using electrostatic and hydrogen bonding mechanisms, and have shown increases in ionic conductivity of 3 or 4 orders of magnitude. DeLongchamp, D. M.; Hammond, P. T. Chem. Mater. 2003, 15, 1165-1173; DeLongchamp, D. M.; Hammond, P. T. Abstr. Pap. Am. Chem. Soc. S22:136-PMSE, Part 2 2001; Tokuhisa, H.; Hammond, P. T. Adv. Funct. Mater. 2003, 13, 831-839. These differences are further enhanced by the fact that ultra thin films can be formed using the LBL technique, making the final conductance closer to that required for power applications. One can tune the thickness and permeability, as well as the composition, of these films through choice of polyelectrolytes and adsorption conditions. For example, using strong polyelectrolytes with hydrocarbon backbones yields LBL films that tend to be either strongly or moderately hydrophobic, thus discouraging proton exchange. On the other hand, LBL films assembled using weak electrostatic and secondary interactions (i.e. long-range hydrogen bonding or dipole-dipole), particularly those with hydrophilic backbones, support proton-exchange.

The advantages gained using polyelectrolytes to synthesize the LBL PEM membrane should apply to the synthesis of LBL electrodes. On top of fast ion conduction LBL electrodes demand high electronic conduction, strongly hydrophobic to expel water, stable to chemical and mechanical degradation, assessable to control loading of catalysts, intimately adhere to the PEM and the GDL to ensure proper passage of the ions, capable of producing open-circuit-potentials similar to a pure metal. Larminie, J.; Dicks, A. Wiley, New York 2000; Gottesfield, S.; Zawodzinski, T. Adv. Electrochem. Sci. Eng. 1997, 5, 195-301; Glipa, X.; Hograth, M. Dept. of Trade and Industry (UK) homepage 2001. Conducting polymers were successfully used to assemble LBL electronically conducting films. Rubner, M. F.; Stockton, W. B. Macromolecules 1997, 30, 2717-2725; Rubner, M. F.; Fou, A. C. Macromolecules 1995, 21, 7115.; Rubner, M. F.; Cheung, J. H.; Fou, A. F. Thin Solid Films 1994, 244, 985; DeLongchamp, D. M.; Hammond, P. T. Abstr. Pap. Am. Chem. Soc. S22:136-PMSE, Part 2 2001; DeLongchamp, D. M. PhD Thesis, Massachusetts Institute of Technology, MA 2003. Unfortunately, LBL conducting polymer films are weak ionic conductors, not stable and degrade in a sever electrochemical environment. A more resilient combination is a polyelectrolyte-colloid such that the colloid is electronically conducting and ready to assemble. Many colloids can assemble with polyelectrolytes but the LBL films are not conducting. Kotov, N. A.; Dekany, I.; Fendler, J. H. J. Phys. Chem. 1995, 99, 13065.; Mallouk, T. E.; Feldheim, D. L.; Crabar, K. C.; Natan, M. J. J. Am. Chem. Soc. 1996, 1181, 7640-7641.; Grabar, K. C.; Natan, M. J.; Freeman, R. G.; Hommer, M. B. Anal. Chem. 1995, 67, 735-743.; Hammond, P. T.; Rubner, M. F.; Zheng, H. P.; Lee, I. Adv. Mater. 2002, 14, 569-572. Only one original approach used exfoliated graphite oxide that is not conducting to make LBL films because graphite cannot be dispersed in water and it forms micrometer-sized irregular aggregates in organic solvents. The GO can be converted to graphite under sever reduction conditions with $H_2$ gas. Fendler, J. H.; Cassagneau, T. Adv. Mater. 1998, 10, 877-881.; Kotov, N. A.; Dekany, I.; Fendler, J. H. Adv. Mater. 1996, 8, 637. Our method directly employs polyelectrolyte graphite mixtures to assemble LBL electrodes without having to convert the graphite powder to exfoliated GO and then back to graphite where in both processes expensive and sever chemical and thermal conditions applies. The LBL polyelectrolyte-Carbon electrodes [LPCE] achieved most of the requirements stated above, thus providing a cheaper and practical way of making electrochemical electrodes.

SUMMARY OF THE INVENTION

The invention provides improved ion exchange and gas diffusion membranes for use in electrochemical cells, a process for making porous frameworks, membrane and electrode assemblies fabricated using porous frameworks, and the application of the membrane and electrode assemblies to a variety of devices, both electrochemical and otherwise.

DETAILED DESCRIPTION OF THE INVENTION

Figure 1:
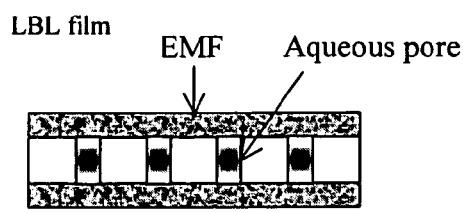
FIG. 1 depicts SEM pictures of LBL films composed of (a) PANI/PAMPS [10 kV, M=11000] covering the surface of a Nucleopore membrane with the pores appearing in the crevice; and (b & c) PEO/PAA [15 kV, M=8000, P=1.9 Torr] with the Nucleopore clearly sandwiched between the LBL films (a cross sectional view). Also shown a simplified sketch of the profile of the "composite membrane".
Figure 1:
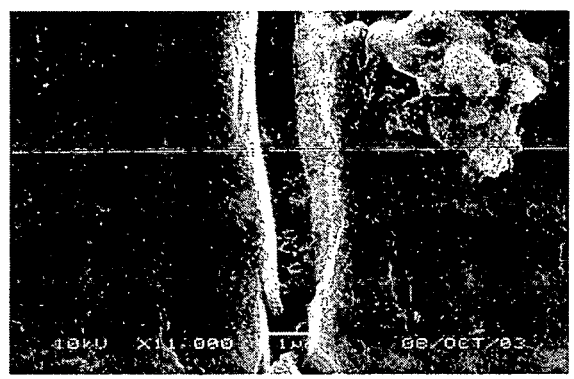
Figure 1:
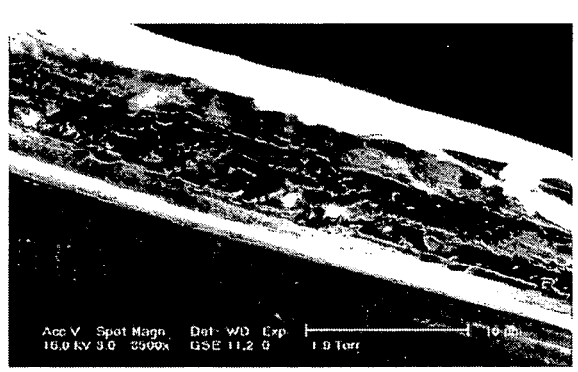
Figure 1:
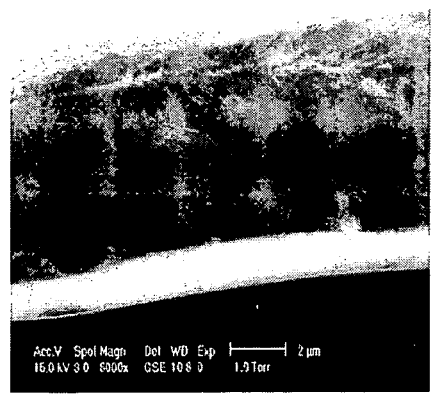

The invention will now be described more fully with reference to the accompanying examples, in which certain preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

I. Process for Making Ion-Exchange Membranes (IEMs)

Polyelctrolytes Used in IEM Fabrication. The polyelectrolytes utilized were taken from the group consisting of poly (styrene sulfonic acid, sodium salt) [PSS; MW=70,000]; poly (diallyldimethyl ammonium chloride) [PDAC; MW=240,000]; linear poly(ethyleneimine) [LPEI; MW=25,000]; poly (acrylic acid) [PAA; MW=90,000]; poly(styrenesulfonic acid-maleic acid, sodium salt) [PSSM3:1; MW=20,000]; poly(ethylene oxide) [PEO; MW=4,000,000]; poly(methylacrylic acid) [PMA; MW=100,000]; poly(acrylic-co-acrylamide acid, sodium salt) [PAAcoAAm, MW=10,000,000 40% carboxy]; poly(2-acrylamido-2-methyl-1-propane sulfonic acid) [PAMPS=2,000,000]; poly(dimethylamine-co-epichlorohydrin) [PDME]; polyaniline (Emarlidine base) [PANI, MW=100,000].

Choice of Polyelectrolytes. Ion exchange membranes (IEM), particularly the proton-exchange membrane (PEM) of fuel cells, are used in solid state electrochemical systems to replace the aqueous electrolyte. Various types of IEMs, of acceptable ionic conductivity, can be assembled using LBL technique. At least two types of water-soluble macromolecules capable of electrostatic or secondary interactions should be utilized, and one of them should promote ionic conductivity. The concentrations of the macromolecular solutions can range from about 1.0 mM to about 20.0 mM, regardless of the nature of the polyelectrolyte. The pH of assembly is relevant only in the case of LBL films which incorporate weak polyelectrolytes (i.e. polyelectrolytes where the charge density along the chain can be readily controlled by adjusting the pH values of the polyelectrolyte solution). For example, weak polyelectrolytes such as LPEI/PAA at pH=4, PEO/PAA at pH=2.5 or at pH=2.0, PAAm/PAA at pH=2.8, PAAm/PAA-co-PAAm at pH=2.0, and PDAC/PAA-co-PAAm at a pH>5 form IEMs of acceptable ionic conductivity. In contrast, the LBL assembly of strong polyelectrolyte couples is pH independent; however, in these cases the thickness of the film depends on the concentration of the dosing salt (i.e. 10.0 mM PDAC (0.5M NaCl)/5.0 mM PAMPS (0.5M NaCl) at any pH).

Water solubility of all the films components is not a limitation when forming IEMs by the LBL technique. For example, ion conducting colloids (e.g., cationic or anionic latexes, zeolites, and zirconia salts) can also incorporated into LBL films to form IEMs. Colloids that possess strong functional groups, such as sulfonates, phosphates, and quaternary ammonium groups are pH independent, while those with weak functional groups, such as carboxylates, primary, and secondary amine groups, are pH dependent and can only assemble LBL films of the instant invention at a pH range of about 2 to about 4. In addition, cationic and anionic dendrimers, which fall under the same category as the ion conducting colloids, can also be assembled into films under similar LBL conditions to form IEMs.

Choice of Substrates for LBL deposition. It will be appreciated that materials with an inherently charged surface are particularly attractive substrates for LBL assembly of an inventive thin film. Alternatively, a range of methods are known in the art that can be used to charge the surface of a substrate, including but not limited to plasma processing, corona processing, flame processing, and chemical processing (e.g., etching, micro-contact printing, and chemical modification). For example, plastics can be used as substrates, particularly if they have been chemically modified to present polar or charged functional groups on the surface.

In one approach to IEM fabrication, the LBL film can be deposited directly onto a hydrophilic porous framework. Porous polymer membranes include all types of organic and inorganic, nano or micro-pore filter membranes which can be made hydrophilic, as mentioned above, by plasma etching with an acidified dichromate solution, a $H_2O_2/H_2SO_4$ solution or a $H_2O_2/NH_3$ solution. After etching, the porous substrate can be coated on both sides by an LBL multilayer film to form a composite membrane which can act as an IEM.

Interestingly, in some cases the LBL IEM can be directly affixed to an electrode to form a membrane-electrode assembly (MEA). It is important to note that depositing an LBL film on the surface of an electrode requires a membrane thickness that is at least two times thicker than the rough surface of the electrode; the requirement is to prevent short-circuiting of the cell after the electrodes are pressed together. A more detailed discussion of MEAs is found in a subsequent section.

Certain LBL membranes themselves can be made hydrophilic (i.e. converted to a porous structure suitable for LBL deposition) simply by changing the pH or salt concentration (e.g., assemble 10.0 mM LPEI/PSSM at pH=4 then change the pH to <2.0, similarly this can be done with LPEI/PAA, PAH/PAA) thus forming a framework which can be coated on both sides by a second LBL multilayer film to form a composite membrane which can act as an IEM.

Similarly, if an LBL film is made from polyelectrolytes and micro or nano latex spheres, zeolites, platelets, or other colloidal particulates (e.g., 10.0 mM PDAC/2% sulfonate latex suspension), it can by fabricated in such a way that it posses crevice structures, thereby generating a porous framework which can be coated on both sides by a second LBL multilayer film to form a composite membrane which can act as an IEM.

Methods of Assembly of LBL Films. In certain embodiments, the LBL assembly of inventive films may involve a series of dip coating steps in which the substrate is dipped in alternating polycationic and polyanionic solutions. Additionally or alternatively, it will be appreciated that deposition of alternating polycationic and polyanionic layers may also be achieved by spray coating, brush coating, roll coating, spin casting, or combinations thereof.

Examples of Post Fabrication Modifications. The synthesis of the IEM LBL multilayer film is a fully controlled process. For example, an LBL film made from one type of macromolecules can be capped with a thinner LBL film of another type of macromolecules (e.g to repel water); or an LBL film can be chemically, thermally or photochemically treated to induce cross-linkages, thus enhancing its chemical and mechanical stability; or an LBL film can be tailored to the desired thickness (i.e. up to several micrometers) and to the desired size (i.e. from meters down to a few microns).

Properties of Composite Membrane. Since at least two water-soluble macromolecules are needed to make up an LBL film, it follows that a composite membrane will possess different chemical and physical properties depending on the chemical structure of the constituent macromolecules. Some examples of this phenomenon include: an LBL film containing zeolite clusters blocks methanol permeation, while an LBL film containing only polyelectrolytes cannot; an LBL film capped with inorganic colloids or latexes resists peroxide degradation; an LBL film capped with a hydrophobic polyelectrolyte repels water at the cathode; and most importantly, in the case of the instant invention, the observation that hydrophobic polyelectrolytes (e.g., PDAC/PSS) exhibit a lower ionic conduction than hydrophilic polyelectrolytes (e.g., LPEI/PAA).

Interestingly, an LBL membrane of the present invention behaves as a sponge which can absorbs ions allowing the enhancement of the ionic conductivity of the film. Depending on the materials used to form the composite membrane, either the matrix or the pores can be embedded with chemicals to enhance the ionic conductivity of the membrane. Chemicals which can be embedded can be selected from the following: hydrogels (e.g., PEG, OEGDA, PAAm, PVA, PVP); polyions (e.g., polyphosphates, Nafion®); micron or nano-size colloids, platelets, and zeolites; all types of proton sponges; organic molecules (e.g., ethylene glycol and glycerol) that are known to increase proton conductivity; and all types of acids and salts of an organic and inorganic nature.

In an example of this process, a composite membrane (or the soft MEA) can be soaked in about 40.0 mM of the dosing solution (range about 10.0 to about 50.0 mM; 1% to 5% for some polymer solutions) for about 30 minutes (range 5.0 minutes to 24 hour; depending on the size of the molecule) and an increase in ionic conductivity will be observed. For example, a soft MEA [PDAC/PAMPS membrane-electrode] soaked in 2.5% Nafion117 solution showed a ten fold increase in its ionic conductivity.

IIa. Membrane-Electrode Assemblies (MEAs) to Form LPCEs

Overview of the Fabrication of LBL polyelectrolyte-carbon electrodes (LPCEs). LPCEs are formed by standard LBL techniques using polyelectrolyte-carbon-catalyst colloidal suspensions. LPCEs, along with IEM can be combined to form soft membrane-electrode assemblies (MEAs). There are two conventional methods that electrochemical and fuel cell technologists use to fabricate a membrane-electrode assembly (MEA). One method is direct application. Therein one deposits the LPCE directly on any classical IEM (e.g., PSS gel, Nafion®) or an IEM consisting of an LBL composite membrane (as described above in Section I). There is also an indirect application approach. Therein one deposits the LPCE directly on any gas diffusion substrate that is electronically conductive (e.g., carbon cloth, porous stainless steel, porous silicon, porous titanium alloys, etc.) to form the catalyst layer.

Polyelctrolytes Used in LPCE Fabrication. The polyelectrolytes utilized were taken from the group consisting of poly(styrene sulfonic acid, sodium salt) [PSS; MW=70,000]; poly(diallyldimethyl ammonium chloride) [PDAC; MW=240,000]; linear poly(ethyleneimine) [LPEI; MW=25,000]; poly(acrylic acid) [PAA; MW=90,000]; poly(styrenesulfonic acid-maleic acid, sodium salt) [PSSM3:1; MW=20,000]; poly(ethylene oxide) [PEO; MW=4,000,000]; poly(methylacrylic acid) [PMA; MW=100,000]; poly(acrylic-co-acrylamide acid, sodium salt) [PAAcoAAm, MW=10,000,000 40% carboxy]; poly(2-acrylamido-2-methyl-1-propane sulfonic acid) [PAMPS; MW=2,000,000]; poly(dimethylamine-co-epichlorohydrin) [PDME]; polyaniline (Emarlidine base) [PANI, MW=100,000] and Nafion 117 as a 5% resin solution.

Synthesis of the Carbon-Catalyst Colloidal Suspensions. A carbon colloidal suspension was considered reliable for LBL assembly if the carbon particulates did not settle to the bottom leaving a gray or clear layer above them. The settlement test was done after stirring the mixture, followed by sonication for one hour, then leaving the carbon colloidal suspension to rest (i.e. no stirring or agitation of any kind) for one day. The carbon colloidal suspension was prepared by dissolving 0.004 g of the carbon powder in 1.0 mL of 10.0 mM polymer solution if the powder was dry. For the aqueous carbon paste, that was not loaded with the catalyst, a prior step was taken. The platinum powder (0.02 g) was sonicated in 100.0 mL of 10.0 mM polymer solution for one or two hours to ensure proper dispersal of the catalyst. Afterwards carbon paste (1.0 g) was added to the 100.0 mL catalyst-polymer solution followed by 1 hr sonication. The following properties indicate the type of carbon and polymer products that can be used to prepare a suitable carbon colloidal suspension. The properties of the carbon needed for a suitable collidal suspension include a graphite type that possess low electrical resistivity (i.e. $<5 \times 10^{-4}$ $\Omega$cm). For example, 10% platinum on activated carbon was successfully deposited on a PDAC/PAMPS LBL film.

For example, using scanning electron microscopy (SEM), an LPCE synthesized by mixing carbon paste and Pt powder (size ~0.15-0.45 μm) showed ~10-20 μm Pt agglomerates dispersed between carbon particulates. In addition the carbon should be treated or pretreated with a base such as ammonia solution or its organic derivatives in order to disperse it properly in aqueous solution. For example, the Hispec3000 powder was processed at pH=10 to 11, the graphite paste is ammonia treated according to manufacturer's specifications, while the untreated dry graphite powder failed to form any colloids. Furthermore, the carbon should have a small particle size (about 1.0 μm or less) to form good colloids as settlement depends on atomic mass according to Stokes law, while sub micron size colloids are needed to fabricate micron size power devises. Finally, the carbon should be loaded with nanometer size catalyst colloids rather than having the catalyst mixed with it. For example, using scanning electron microscopy (SEM), an LPCE synthesized by mixing carbon paste and Pt powder (size ~0.15-0.45 μm) showed ~10-μm Pt agglomerates dispersed between carbon particulates. Unfortunately, the bigger the platinum colloids the faster they settle down in solution and their surface area becomes smaller hence less power is generated.

It should be noted that all the carbon colloids used in this study were not of the submicron size according to the manufacturer's specifications and SEM. In colloidal suspensions that were prepared but not used a colloidal layer formed on top of the agglomerates indicating a segregation of the small particulates that remained in solution while the larger ones settled down. Many commercial electrodes use carbon colloids that are 100 nm or less in size and therefore are expected to give positive tests with most polymer solutions.

Properties of the catalyst. The catalyst could be inert type (e.g., noble metals Pt, Au, Ru) or active type (e.g., any metal Zn, Cu, Ag). For example, Pt and Al powders were mixed with carbon paste to prepare colloidal suspensions for LPCEs according to the procedure explained above. In addition, the catalyst should be properly dispersed in solution using stabilizers such as PVP or suitable polyelectrolytes in order to prevent agglomeration. For example, Pt colloids were successfully prepared and dispersed in PAA, PSS and PANI solutions. Finally, since Stokes law states the size of the colloidal metallic catalyst used depends on its atomic mass and since platinum colloids should have a maximum size of 60 nm to remain suspended for few days (vida supra), Pt-carbon-polymer colloidal suspension are robust enough to deposit platinum particulates of only a few microns in size.

Properties of the polymer solution. In general, all strong polyelectrolytes such as poly(−) PSS, PAMPS, Nafion and poly(+) PDAC, PAH successfully formed carbon colloidal suspensions. Best results were obtained when Hispec3000 or 10% Pt on activated carbon were treated with PDAC as poly (+) solution and PAMPS as a poly(−) solution at pH=10 to 11. In general, weak polyelectrolytes, such as poly(−) PAA, PAA-co-PAAM and poly(+) LPEI, yielded best results with the aqueous carbon paste. The LPEI/carbon paste and PAA/carbon paste colloidal suspensions were prepared and used in LBL deposition at pH=4 without having to increase the pH to pH=11. In fact, a PAA/carbon paste suspension lasted for months. The same polyelectrolytes tended to produce agglomerates with the Hispec3000 or 10% Pt on activated carbon. At high pH PAA and PAA-co-PAAm yield quality Hispec3000 or 10% Pt on activated carbon suspensions that can be used in LBL deposition. Using a low pH<2 to render weak polyelectrolytes, such as LPEI, strongly positive was not effective because at low pH the carbon colloids tend to agglomerate.

LBL deposition to assemble the LPCE. To insure acceptable electrical conductivity and good catalyst loading of both polyelectrolytes the poly(−) and the poly(+) solutions were loaded with carbon and platinum (or catalyzed carbon). This method of colloidal LBL deposition is unlike any other LBL method in the literature as the colloids are placed in both the poly(−) and the poly(+) solutions. All previous LBL methods have the colloid in one beaker and the polyelectrolyte in another. Whether using (+)LPEI(10.0 mM, 100 mL)/C(0.1 g)/Pt (0.02 g) with (−)PAA(10 mM, 100 mL)/C(0.1 g)/Pt (0.02 g) or (+)PDAC(10.0 mM, 100 mL)/Hispec (0.1 g) with (−)PAMPS(5 mM, 100 mL)/Hispec (0.1 g) the C/Pt colloids were deposited on the substrate in every dipping. Thus the graphite particulates are held in intimate contact and an electronic conductivity up to 2.0 $Scm^{-1}$ was recorded. Unlike LBL conducting films that use conducting polymers such as poly(aniline) or poly(pyrrol), the LPCE electrical conductivity does not degrade with time. Moreover, X-ray SEM analysis showed similar levels of catalyst loading when a Hispec3000 powder sample was compared to an LBL deposited sample. However, a 10 bilayer LPCE (Hispec3000 type) showed nearly 2.5 times less in platinum loading compared to a commercial E-TEK® electrode. This should not be a problem because the catalyst layer in the E-TEK® is around 30 μm thick while the 10 bilayer LPCE was measured by profilometry to be ~6 μm thick. The dipping time in the carbon colloidal suspension was 20 minutes followed by 2.0 minutes drying and three rinses with pure water where each rinse lasted for 2.0 minutes without any agitation.

From an industrial and economic point of view the cost of preparation and handling the carbon colloidal suspensions should also be considered. We have tested the number of LBL depositions and the total surface area of the assembled electrodes; a 100 mL solution used over two weeks was capable of producing LPCEs of a total surface area ~50 $cm^2$. The carbon colloidal suspensions are also recoverable and recyclable. Recovery of the carbon and platinum is achieved by evaporation of the solvent (water). This reisolated material, plus an additional quantity of material, added to account for the lost mass of solids, can be stirred and sonicated in 100 mL poly(+) or poly(−) solution and the process repeated.

Depositing and testing LPCEs on solid substrates. In order to check on its effectiveness, the LPCE was first deposited on solid substrates, such as platinum, gold, porous stainless steel, and Silicon-100. Gold was first dipped in a poly(−) colloidal suspension because it has a positively charged surface. After 10 bilayers, the gold surface was completely covered with the LPCE. On a Si-100 substrate that was originally covered with 40 bilayers of PDAC/PAMPS, a 10 bilayer Hispec3000 based LPCE showed an average thickness of ~6 μm measured by profilometry.

Testing the open circuit potential (OCP) of the LPCE. To check on the electrochemical activity of an LPCE-coated gold electrode [Pt—C/Au] the OCP of bare gold and bare platinum electrodes were tested against a standard calomel electrode (SCE) in a 20 mM $H_2SO_4/H_2$ (g) purged solution with the following results: Pt/0.02M $H_2SO_4/H_2(g)$//SCE the OCP=+0.32 to +0.359 V; Au/0.02M $H_2SO_4/H_2(g)$//SCE the OCP=−0.005 to +0.02 V; and for a carbon coated gold electrode: [C/Au]/0.02M $H_2SO_4/H_2(g)$//SCE the OCP=+0.005 to +0.03 V; while for a carbon/platinum coated gold electrode: [Pt—C/Au]/0.02M $H_2SO_4/H_2(g)$//SCE the OCP=+0.345 to +0.347 V.

It is clear that the [Pt—C/Au] yielded an OCP in the same range as an uncoated pure Pt electrode. Similarly, a porous stainless steel SS316L filament was coated with the Hispec3000 catalyst to give an OCP=+0.338 V. In fact two LPCE-Hispec3000 coated SS316L filaments each purged with $H_2$ and air respectively yielded an OCP=+0.65 V. When a 10 bilayer LPCE-Hispec3000 coated SS316L filaments were utilized in a galvanic cell (acting as an aqueous fuel cell) where the cathode compartment contained an acidified dichromate solution (10.0 mM $Cr_2O_7^{2-}$ in 1.0 $NH_2SO_4$) as an oxidizer and the anode compartment contained a basic borohydride solution (10.0 mM $BH^{4-}$ in 0.5M NaOH) as a reducer it generated an OCP=+1.63V, while pure platinum electrodes yielded an OCP=+1.58V, and the uncoated SS316L filament electrodes yielded an OCP=+0.89V. The difference in the power generated is 2.0 $mWcm^{-2}$ by the LPCE-Hispec3000 coated SS316L, 0.088 $mWcm^{-2}$ by the uncoated SS316L filament electrodes, and 0.06 $mWcm^{-2}$ by the pure platinum electrodes. Results from the power generated signify effective platinum loading in the matrix of the LPCE. Note that the aqueous fuel cell (described below) was used to compare performance because its salt bridge recorded several hundred ohms of internal impedance.

Testing the ionic conductivity of the LPCE. The following electrodes of the same area were placed in acidic solution at the same distance from a bare platinum electrode and the impedance was measured. For a bare gold electrode: Au/0.02M $H_2SO_4$/Pt the Z=70Ω; and for a carbon coated gold electrode: [Au—C]/0.02M $H_2SO_4$/Pt the Z=72Ω; and for a carbon/platinum coated gold electrode: [Au—C/Pt]/0.02M $H_2SO_4$/Pt the Z=72Ω. The results showed a 2Ω increase in impedance, implying that the LPCE exhibits a high ionic conductivity when fully wet and an indication of its highly porous nature.

Depositing and testing the LPCEs on polymer membranes. The LPCE was successfully deposited on membranes such as Nafion112® and PDAC/PAMPS composite membrane. LPCEs based on carbon paste were deposited directly on Nafion112® surface while LPCE based on Hispec3000 failed. In this case, the Nafion can be functionalized with a few bilayers of PDAC/PAMPS and the Hispec3000 can be successfully deposited on Nafion112® membrane. LPCEs based on the three carbon brands (that is, aqueous carbon paste, Hispec3000, and 10% activated carbon) were successfully deposited on the PDAC/PAMPS composite membrane to form soft "MEA" or catalytic surfaces. The LPCE was found to adhere intimately to the ion conducting membrane eliminating the need to apply hot pressing (at a temperature of about 180-200° C. and a pressure of about 70 to 80 atmospheres for about 2 minutes) to fabricate the MEA, as is usually needed with conventional fabrication methods.

Conventional deposition techniques. In some cases, LBL deposition to assemble an LPCE is not necessary. Analogous to conventional methods of fabricating the catalyst layer, a polyelectrolyte complex gel replaces a Nafion® ionomer solution instead. The slurry of a polyelectrolyte complex solution plus catalyst ink/PTFE emulsion/stabilizer can be poured directly onto the composite membrane to form a uniform film which is then dried and hot pressed. Uniformity and thickness depend on the method used, such as spin coating, decaling, or spraying. These methods are faster than LBL deposition but are incapable of thickness control, uniformity, compactness, and performing microcontact printing.

Properties of a Soft Membrane-Electrode-Assembly (MEA). When properly mounted, a soft MEA, running on $H_2$ and air, produced a stable OCP up to +0.9V similar to any commercial MEAs. The overall impedance $Z_T$ (i.e. contact impedance, electronic impedance, and ionic impedance) hence the conductivity of a PDAC/PAMPS soft MEA was measured and compared to both an E-TEK®/PDAC/PAMPS MEA and a commercial MEA under similar conditions. A commercial MEA gave a $Z_T=2\Omega$ at RH~95%. An E-TEK®/PDAC/PAMPS MEA gave $Z_T=85\Omega$ at RH~94% and $Z_T=70\Omega$ during fuel cell operation. In fact, around 60$\Omega$ were lost to contact resistance in our E-TEK®/LBL MEAs. With a PDAC/PAMPS soft MEA a $Z_T=10$ to 20$\Omega$ was achieved at RH~95%. The reason for such a high conductivity resides in the adaptability of the LBL technique. When the PDAC/PAMPS soft MEA is installed dry without dosing with a plastisizer solution its $Z_T=5000\Omega$ at RH~55%. When the same soft MEA is dosed with 0.02M $H_2SO_4$ solution its $Z_T=250\Omega$ at RH~60% and $Z_T=100\Omega$ at RH~95%. Dosing with a mixture of 0.02M $H_2SO_4$/2.5% Nafion117® solution yielded a $Z_T=30\Omega$ at RH~95% and $Z_T=10\Omega$ at RH~99% which is another indication that a soft MEA is capable of high ionic conductivity.

IIb. Membrane-Electrode Assemblies (MEAs) to Gas Diffusion Layers (GDLs)

The synthesis mechanism is exactly the same as the LPCE assembly described above with the omission of the catalyst in all its forms. The size of the particle of carbon or any electronically conducting colloid should be micron size to ensure good diffusion of gases. GDLs made from aqueous carbon paste were found to adhere intimately to the preceding catalyst (i.e. LPCE) layer and provided high electrical conductivity. As with the LPCE, the GDL should also be hydrophobic to expel water and allow the diffusion of gases.

IIIa. Devices—Fuel Cells: Polyelectrolyte Multilayer Thin Films as PEMs

We have developed polyelectrolyte multilayer thin films with relatively high ionic conductivity constructed with hydrophilic weak polyelectrolytes, using either electrostatics or hydrogen bonding as a means of assembly LPEI/PAA and PEO/PAA. In particular, films constructed from linear polyethyleneimine (LPEI) and poly(acrylic acid) (PAA), exhibited ionic conductivity as high as $10^{-5}$ Scm$^{-1}$ at 100% relative humidity and room temperature; these films also exhibited high ionic conductivity at ambient conditions (50% RH, 25° C.) when prepared and post-treated with an oligoethyleneoxide/aqueous solution at low pH. Polyethylene oxide (PEO) and PAA alternating thin films were constructed through hydrogen bonding interactions, and stabilized with light crosslinking, to obtain films with conductivities of $10^{-5}$ to as high as $10^{-4}$ Scm$^{-1}$ at ambient conditions when films were constructed at high salt concentrations. In both cases, the ionic conductivity was optimized at film assembly conditions which led to thick polyion bilayers, and loopy, coiled polymer surface conformations. The use of LPEI, PEO and other polymers with a relatively hydrophilic nature greatly enhanced ion conduction in these films.

Herein, ultrathin LBL polymer films were utilized as the top, continuous thin film layer of a composite polymer membrane. A nonconducting porous substrate was chosen as the intermediate, or core layer, in this construction. Here we use a commercially available polycarbonate Nucleopore® membrane, which has a total thickness of 6.0 μm, and regular pores of 100 nm diameter, as the base membrane. The pores in the Nucleopore membranes are created via gamma irradiation, and are therefore cylindrical and regular in geometry, with single pores traversing the entire thickness of the film. This simple geometry provides a clear path of ion transport, and thus the pores act as the conducting channels between the two LBL film/electrode assemblies.

The Nucleopore base was then plasma treated and, in all cases, a 40 bilayer thin film of the LBL polymer pair of interest was constructed onto the surface of the membranes. By selecting the molecular weight and ionic strength or solution pH, it was possible to tune the hydrodynamic radius of the polyion of interest in solution. If the hydrodynamic radius is relatively small compared to the pore diameter, a multilayer thin film will form within the pores; however, if the molecular weight and solution conditions are such that the polymer chains, are larger than or close to the pore size of interest, assembly results in bridging of the pore diameters, and the film builds up only on the outer surface of the membrane. The molecular weight of the polymers used was such that the pore diameters were bridged, and the multilayer film existed only on the base membrane surface. This fact was confirmed by scanning electron microscopy (SEM), as shown in FIG. 1(a-c). A top view of the composite membrane, for which a part of the film was removed with a stylus, indicates clearly the presence of open pores underneath the top, uniform, pore free LBL film layer. Cross-sectional images in FIG. 1(b-c) indicate that the LBL film is present only on the top surface, and that a symmetric film forms on both sides of the membrane.

Peak areas from transmission FTIR that were measured by referring to the —COOH stretch in PEO/PAA, PEO/PMAA both at (1878-1577 cm$^{-1}$), and LPEI/PAA at (1762-1660 cm$^{-1}$); or the SO$_3$H stretch in LPEI/PSS at (1058-1018 cm$^{-1}$), and finally the —CONH$_2$ stretch in PAN/PAMPS at (1637-1536 cm$^{-1}$) or PAN/PAAcoPAAm at (1632-1535 cm$^{-1}$) were used to determine the relative amount of the PE material deposited on both substrates. Both the Si-100 and the IR transparent Nucleopore substrates showed an average difference of only ±5% an indication that the amount of PE material is similar on both surfaces. Moreover, AC impedance and galvanostat measurements gave much lower resistances than expected if the PE material were to fill the pores. For example, the conductivity of the PEO/PAA LBL film can reach a maximum of $10^{-4}$ Scm$^{-1}$ at RH=100%. Calculations show that a 20 μm thick composite membrane (Table 1) is expected to have a resistance of about 40$\Omega$ if the pores are filled completely with PEO/PAA film. Unexpectedly, the result obtained experimentally was 5 to 13$\Omega$, indicating that the pores and the film were fully soaked. The result of this composite film geometry is that during fuel cell operation at high humidity, the membrane allows the passage of water and ions, ultimately resulting in water-filled pores between the LBL films; the electrodes contacting the LBL films, which serve as a barrier to gases across the membrane, and a gateway for ions generated at the electrodes.

Because of differences in the nature of the multilayers achieved with different polyion pairs, the thickness of the LBL film covering the pores ranged between about 1 μm to about 5 μm on one side of the membrane. The thicknesses as determined by profilometry, and the corresponding pH of assembly for all of the polyion pairs studied here are shown in Table 1; in all cases, the same adsorption conditions were used for both polyions in a given polyion pair. Table 1 also contains the FC open circuit voltages and a summary of the resistance across the composite membrane as measured at 90 to 95% relative humidity and a temperature of 23±1° C. using AC impedance spectroscopy. The resistance as determined from the galvanostat was assumed to be that at 100% relative humidity and not at the humidity of the chamber (50 to 60%) because the fuel cell generates water that is soaked up by the composite membrane. The corresponding conductivities were determined using the equation:

$$\sigma = \frac{t}{R \cdot A} \quad (1)$$

where σ is the conductivity (Scm$^{-1}$), t is the thickness (cm), R is the resistance (Ω), and A is the area of the electrode (cm$^{-2}$). Each of the systems shown below were optimized to achieve optimal ion conductivity via variations in the ionic strength and pH of assembly. It is clear that these systems produce unusually large bilayers, ranging in thickness from 26 to 120 nm/bilayer.

Fuel Cell Measurements and Ionic Conductivity. Beyond providing a mechanical support and added stability to the LBL film, the porous framework of the Nucleopore membrane provides unhindered proton conductivity. One must consider the role of the multilayer thin film and its ionic resistance with respect to the electrolyte filled pores of the porous polycarbonate base.

cluster of water molecules that are in a dynamic equilibrium with the surrounding water pools. Farhat, T.; Yassin, G.; Dubas, S. T.; Schlenoff, J. B. Langmuir 1999, 15, 6621-6623; Losche, M.; Schmitt, J.; Decher, G.; Bouwman, W. G.; Kjaer, K. Macromolecules 1998, 31, 8893. The plane of scatter of ions drift across these sites with a current density (A cm$^{-2}$) such that:

$$j = v \cdot c \cdot F \quad (2)$$

where v (cms$^{-1}$) is the drift velocity of the scattering plane of protons, C (molcm$^{-3}$) is the concentration of ions, and F is the Faraday constant (about 96,500 Cmol$^{-1}$). In the presence of an electric field E (Vcm$^{-1}$) the current density is also defined as:

$$j = \sigma \cdot E \quad (3)$$

Combining equations (2) & (3), the conductivity can be defined in terms of the drift velocity of the plane of scatter of ions.

$$\sigma = v \cdot \frac{c \cdot F}{E} \quad (4)$$

Using Monte Carlo algorithm the drift of the plane of scatter of ions can be monitored across a fixed distance by counting the number of cycles required for the plane to drift from one electrode to the other. Lui, J. S. Monte Carlo Strategies in Scientific computing, NY, Springer ©2001; Madras, N. Monte Carlo Methods, Providence R.I., American Mathematical Society ©2000. In a 2D coordinate space of 400× 200 points a random distribution of a population of hopping sites [5000, representing either water molecules or "hydrated ion pair" exchanger sites] would be used as a ground for a more dilute set of conducting points [50 or a 100, representing

TABLE 1

| Membrane System | Total thickness (μm)/pH assembly | Resistance AC-Impd. (Ω) | Resistance Galvanostat (Ω) | Fuel cell conductivity (S cm$^{-1}$)$^d$ | Open cicuit potential OCP (V) |
|---|---|---|---|---|---|
| LPEI/PSSM | 6.0/4.0 | 1400 | 2500 | 9.6E−07 | 0.92 |
| LPEI/PSS | 2.4$^a$/2.7 | 114 | 136 | 1.23E−05 | 0.87 |
| LPEI/PAMPS | 2.1$^a$/2.5 | c | 104 | 1.56E−05 | 0.82 |
| PEO/PMAA | 8.5$^a$/2.0 | 91 | 145 | 2.0E−05 | 0.87 |
| LPEI/PAA | 6.4$^a$/4.0 | 65 | 76$^e$ | 3.26E−05 | 0.85 |
| PDAC/PAMPS$^b$ | 2.2$^a$/6.0 | 28 | 45$^e$ | 3.64E−05 | 0.89 |
| PDME/PAMPS$^b$ | 2.2$^a$/6.0 | 24 | 30 | 5.46E−05 | 0.64 |
| PEO/PAA | 9.7$^a$/2.0 | ~1.5-5 | 13$^e$ | 0.00024 | 0.88 |
| Nafion112 ® | 50 | ~0.5-1 | 6.7 | 0.0015 | 0.95 |

$^a$Only includes the thickness of the LBL film material on both sides of the pore.
$^b$Polyelectrolyte solutions contained 0.5M NaCl.
c delaminated.
$^d$Area = 0.5 cm$^{-2}$; Thickness = Nucleopore + LBL films; Resistance→Galvanostat.
$^e$determined using the fuel cell equation 3.11 in Larminie, J.; Dicks, A. Fuel Cell Systems 2000, Wiley, New York.

Figure 2:
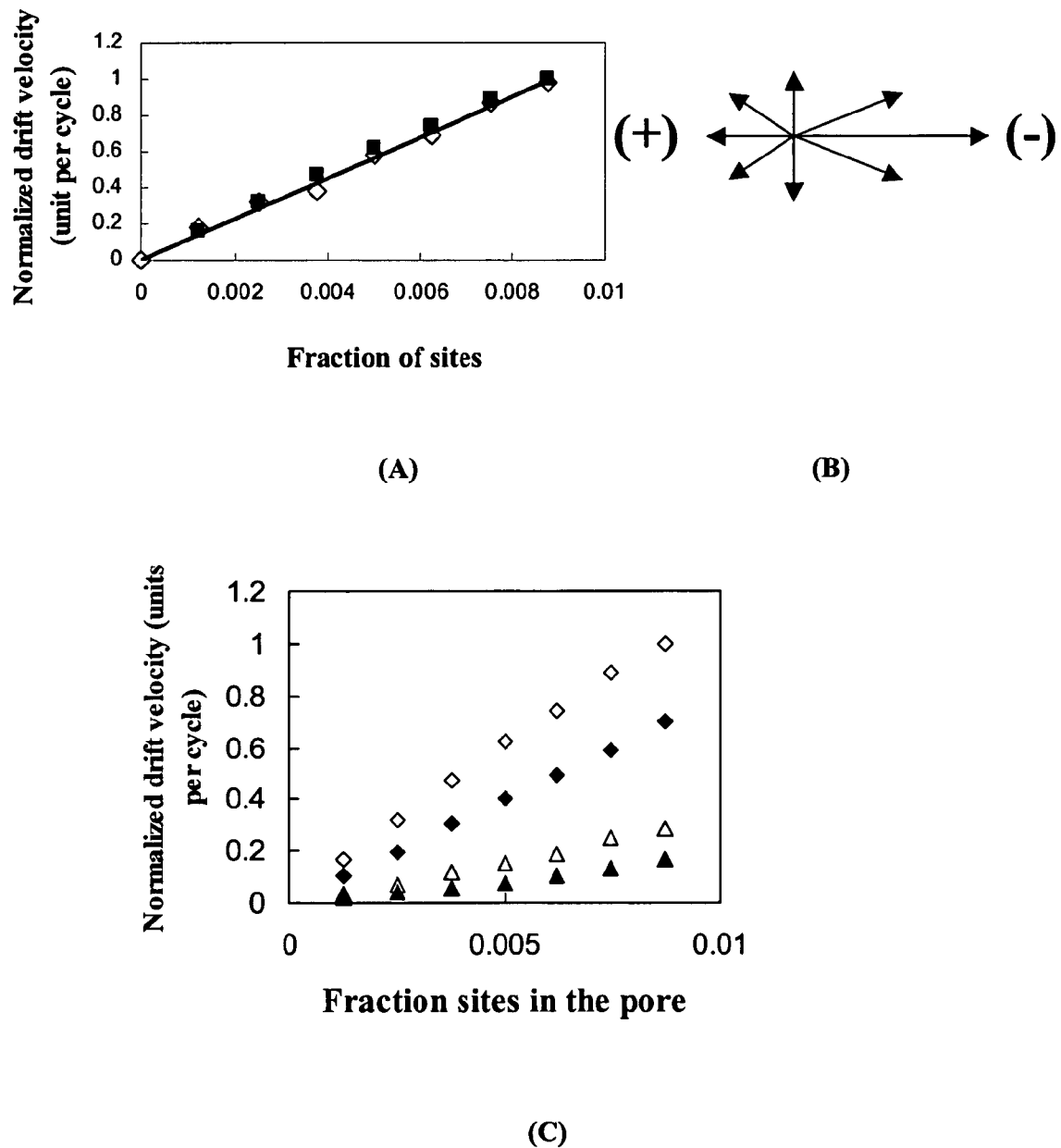
FIG. 2 depicts (a) normalized drift velocity against the fraction of sites in a porous ($\diamond$) and a nonporous (■) matrix. A 2D coordinate space of 400×200 points, randomly distributed hopping sites [5000], a set of [50 or a 100] conducting points making up a wave packet; (b) asymmetric mode of hopping of a conducting point; and (c) normalized drift velocity against the fraction of sites in a pore (i) Saturation of sites representing aqueous phase ($\diamond$), (ii) 60% population of sites (♦), (iii) 20% population of sites (Δ), (iv) 10% population of sites (▲). [% population is out of 5000 hopping sites].

Ionic Conductivity Analysis. The advantage of using a track-etched polycarbonate membrane is the straight pores that traverse the membrane from one side to the other, thus making theoretical manipulation easier. What starts the conduction process is a short burst of ions at the surface of the electrode that disturbs the overall charge neutrality of the system. The protons that propagate across the bulk of the solution by the Grotthuss mechanism would do the same across the hydrophilic exchanger sites of the LBL films. An exchanger site is an ion-pair site that is surrounded by a the protons] to propagate across the 2D system. A hopping point can hop in all directions in an asymmetric way (FIG. 2b) with a tendency to move in the direction dictated by the electric field. It should be noted that interactions based on quantum mechanical treatments, which affect the hopping time, were neglected and if a conducting point strikes a site the hopping attempt is considered successful. Normalized values of the drift velocity plotted against the fraction of exchanger sites whether inside the bulk of the electrolyte or within a pore surrounded by a hydrophobic matrix is shown in FIG. 2a. In both cases the values are overlapping which indicates that the conductivity won't be affected by porosity.

Since proton conduction can largely be related to the concentration of the hopping sites (i.e. the degree of hydrophobicity) then MCA shows that the drift velocity would decrease linearly (plot not shown) as the concentration, expressed here as the % population of sites, was decreased FIG. 2c. Fortunately, MCA proves that by having aqueous pores traversing the LBL composite membrane a maximum conductivity can be achieved (i.e. $\sigma\sim 0.015$ $Scm^{-1}$ corresponding to a 20 mM $H_2SO_4$ solution compared to a $\sigma\sim 10^{-4}$ $Scm^{-1}$ of a PEO/PAA matrix).

Figure 3:
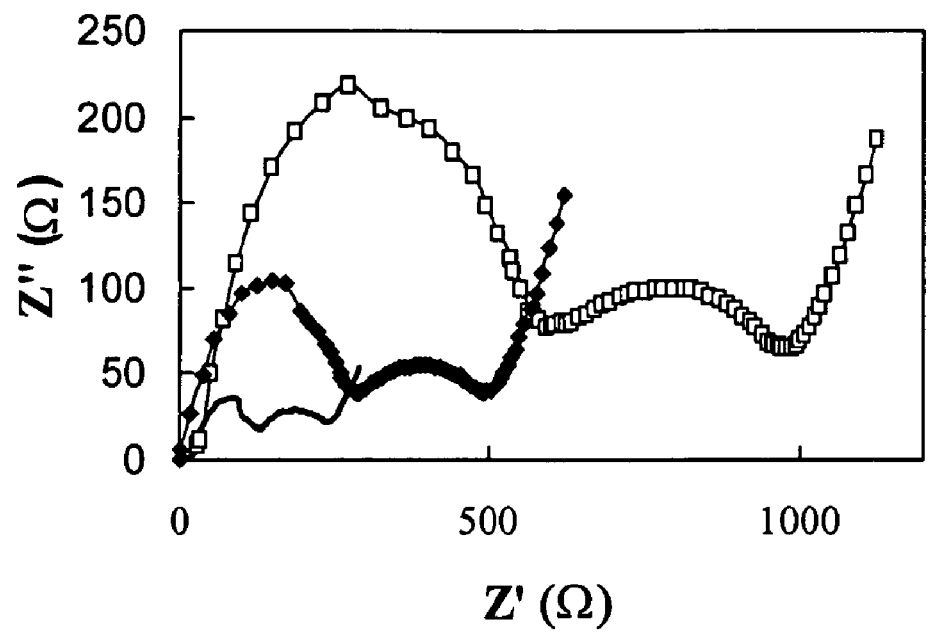
FIG. 3 depicts (a) AC impedance of a PDAC/PAMPS fuel cell running under dry conditions (RH<30%, □) while the humidity was ramped up to RH=50 to 70% (♦), and then to operating conditions Solid line (RH~90%); and (b) as the fuel cell was further purged to saturation the high frequency semicircle referring to the pore's impedance disappeared and the overall impedance Solid line sharply decreased. Frequency=1 to $2\times10^7$ Hz, Applied potential=10 mV. T=22-24° C. Other PE couples exhibited similar behavior.
Figure 3:
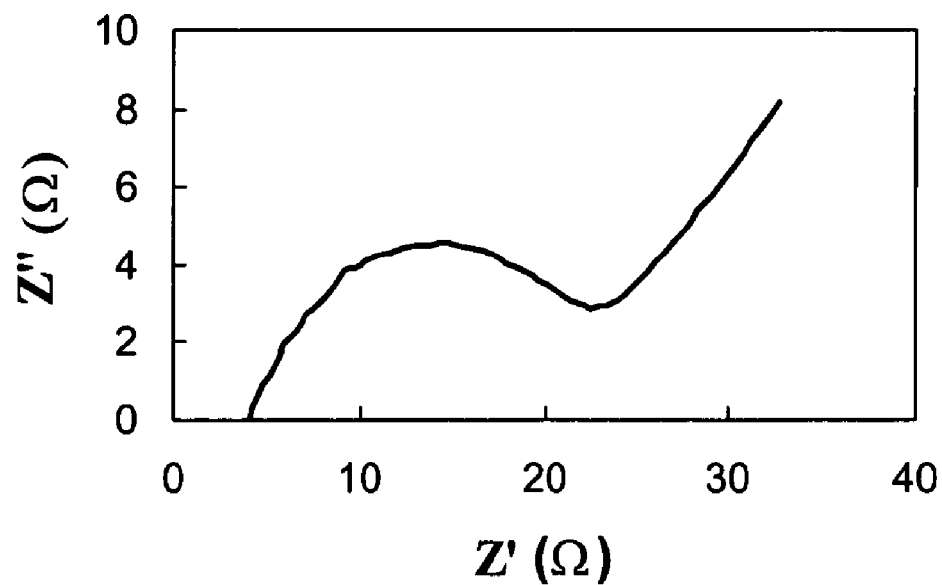

AC Impedance Measurements of Polyion Pair Composite Membranes. Results obtained by AC impedance on fuel cells running under dry conditions (RH<40%) while the humidity was ramped up to operating conditions are shown in FIGS. 3a, 3b. The complexity of the Nyquist plots reflects the structure of the composite membrane. Multiple semi-circles at low humidity indicated a system that is composed of Randle's cells connected in series. As the humidity was ramped up the impedance decreased because the pores of the polycarbonate membrane filled with water. As the fuel cell was further purged to operating conditions the high frequency semi-circle referring to the polarization resistance of the porous electrodes interface or pore's impedance, $Z_p$, disappeared and the polarization resistance of the LBL membrane-electrode interface $Z_m$ impedance was the only feature left (FIG. 3b). The tail of the Nyquist plot, which was assigned as a Warberg Constant-Phase-Element (CPE), indicates that ion diffusion through a microporous structure is indeed occurring in all measurements. The circuit shown in FIG. 4a was used to simulate the behavior of the fuel cell under different humidity conditions using the following equation:

$$Z_T = Z_p + Z_m \quad (5)$$

$$Z_p = \frac{\frac{1}{R_p} - j\omega C_p}{\left(\frac{1}{R_p}\right)^2 + (\omega C_p)^2} \quad (6)$$

$$Z_m = \frac{R_m - X^\varphi \cos\beta - j(\omega C_m R - 2\omega C_m R_m X^\varphi \cos\beta + \omega C_m X^{2\varphi} + X^\varphi \sin\beta)}{(\omega C_m X^\varphi \sin\beta + 1)^2 + (\omega C_m R_m - \omega C_m X^\varphi \cos\beta)^2} \quad (7)$$

$$\beta = \frac{\pi}{2}\varphi, \quad X = \frac{1}{\omega C_W}$$

where $R_p$ is the pore resistance, $C_p$ is the pore capacitance, $R_m$ is the membrane resistance, $C_m$ is the membrane capacitance, $\varphi$ is the fractional exponent, $C_W$ the CPE capacitance, and $X^\varphi$ is the Warberg CPE reactance.

Figure 4:
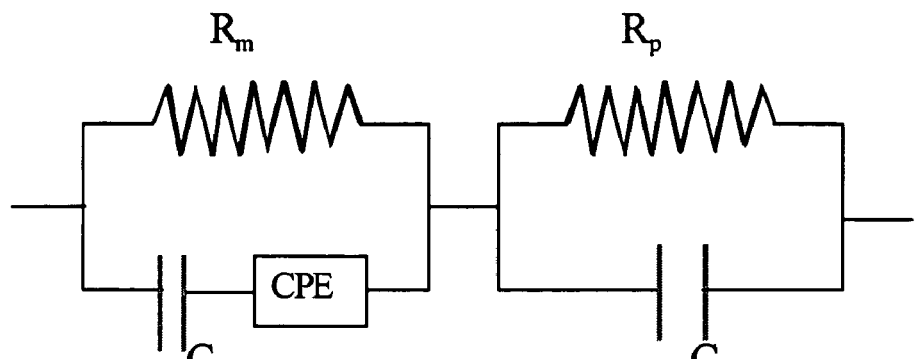
FIG. 4 depicts (a) A system composed of two Randel's cells connected in series showing a Warberg constant-phase element (b) AC impedance plots simulated using the circuit in part (a) at (i) RH<30% (□), $R_m$=390Ω, $R_p$=590Ω, $C_m$=4×$10^{-4}$F, $C_p$=$10^{-5}$F, $C_W$=0.012F, $\phi$=0.8; (ii) RH=50 to 70% (♦), $R_m$=220Ω, $R_p$=270Ω, $C_m$=2×$10^{-4}$F, $C_p$=2×$10^{-6}$F, $C_W$=0.012F, $\phi$=0.8; (iii) RH~90% Solid line, $R_m$=110Ω, $R_p$=141Ω, $C_m$=2×$10^{-4}$F, $C_p$=2×$10^{-6}$F, $C_W$=0.012F, $\phi$=0.8; (c) A fully purged "composite membrane" exhibits a sharp drop in pore resistance and a decrease in the overall impedance, Solid line, $R_m$=22Ω, $R_p$=3Ω, $C_m$=2×$10^{-4}$F, $C_p$=2×$10^{-6}$F, $C_W$=0.012F, $\phi$=0.8.
Figure 4:
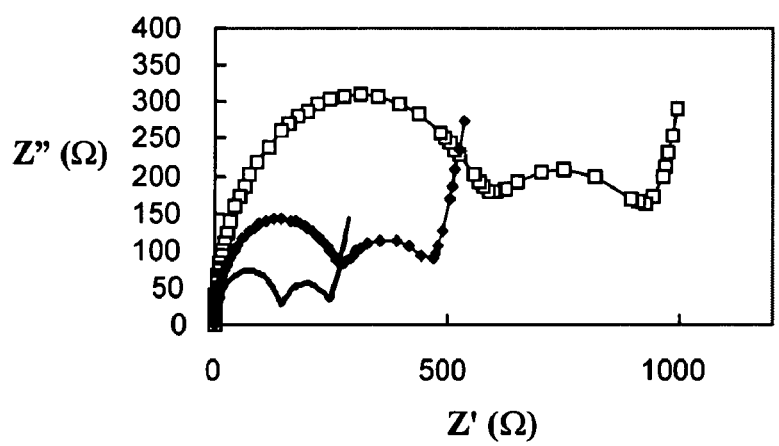
Figure 4:
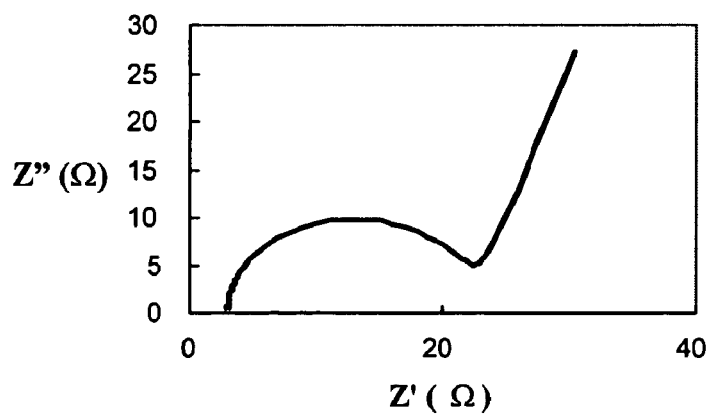

We have considered a contribution from two Randle's cells connected in series. Both the $Z_m$ and $Z_p$ depend on the concentration of $H^+$ ions and on the water uptake, i.e. the degree to which the channels and pools of water interconnect across the composite membrane. The simulated Nyquist plots that utilized the circuit in FIG. 4a showed two effects: (1) A drop in $R_p$ and $R_m$ as humidity is increased leads to an overall drop in the total impedance reflected by a shrinkage in the size of the Nyquist plot; and (2) A sharp drop in $R_p$ (pores fully soaked) diminished one semi-circle (i.e. the pores), leaving one Randle cell that corresponds to $Z_m$ at maximum humidity.

Galvanostat Measurements of Polyion Pair Composite Membranes. After each fuel cell operation the resistance of the MEA was measured using AC impedance and compared to values of resistance calculated from the open circuit potential [OCP] of the fuel cell, and the junction potentials recorded for specified applied currents, where:

$$R_j = \frac{OCP - V_j}{I_j} \quad (8)$$

$$j = 1,2,3 \ldots$$

Equation (8) is a simplified form of the fuel cell equation. Larminie, J.; Dicks, A. Wiley, New York 2000. Simulations using the power density plots of LPEI/PAA showed that results obtained by eq. (8) and the fuel cell equation for $R \geq 10\Omega$ are nearly similar. For all composite membranes, we conclude that the system under study is a combination of $H^+$ ions propagating across a nonporous LBL film phase into a porous aqueous phase thus creating a "nano salt bridge". Values of the resistance showed that when the fuel cell is operating even at low RH of ~50% to 60% the composite membrane performs as if it is wet or at a RH of about 100%. It is probable that dynamic hydration equilibrium is occurring between the water produced at the cathode, the LBL film, and the water within the pores.

Fuel cell performance. In order to compare the performance of our composite membranes to the classical PEM (Nafion112®), both types of membrane were moderately pressed between two commercial Pt/C (ELAT®) electrodes to fabricate the MEA. The MEA was then sandwiched between two homemade bipolar plates that allowed gas diffusion and acted as current collectors. The whole assembly was enclosed inside a two-chamber manifold that contains the fuel gases, and through which the pressure, temperature, and humidity can be controlled at ambient conditions. From the brief description of the FC design it should be noted that all the fuel cell systems studied were run under a regime of non-optimized performance. This design was chosen to minimize any interferences from outside factors such as ionomer wicking inside the composite membrane and thermal or mechanical degradation if press baked or operated at high temperature (>about 60° C.) and pressure (>about 10 psi).

Two control experiments were made to analyze the performance of composite membrane. First, a Nucleopore® membrane sandwiched between two ELAT electrodes should show the highest conductance, hence the maximum power delivery, because the conducting protons are not impeded by the LBL film sealing the pores. A fuel cell running on an uncoated Nucleopore® membrane delivered a maximum power density of 9.6 $mWcm^{-2}$ and its OCP was 0.8V, which decreased with operation to 0.56V due to uncontrolled fuel cross over, thus illustrating the important role of the LBL film in regulating fuel cross over, and the need for this intermediate layer in the MEA. Second, a home-built E-TEK®/Nafion112® fuel cell system was capable of delivering a maximum power of 43 mW $cm^{-2}$ at a RH$\geq$80% and a temperature of 25° C. A strong flow of hydrogen was maintained to obtain high humidity with $P_{air}$=4.0 psi, and the operation time was up to two hours. If the humidity was decreased to a range of 60% to 50%, the power dropped to ~23 mW $cm^{-2}$ while the voltage continuously decreased. When the RH was dropped below 50% the E-TEK®/Nafion112® fuel cell system simply collapsed.

Figure 5:
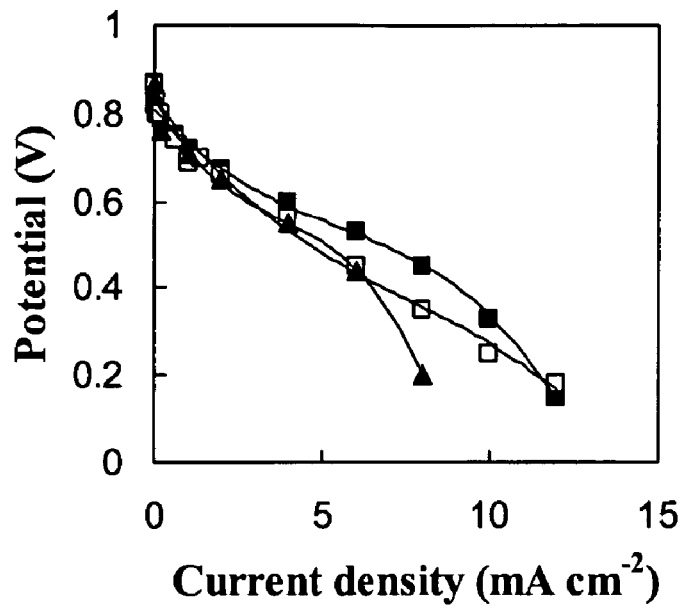
FIG. 5 depicts ((a) Potential (V) vs Current density (mA $cm^{-2}$) for LPEI/PAMPS ■, LPEI/PSS □, PEO/PMAA ▲; (b) Corresponding power density plots for the same set of membranes. Conditions: LPEI/PAMPS, $P_{air}$=2.0 psi, $P_{H2}$=0.5 psi, RH=50-65%. LPEI/PSS $P_{air}$=3.0 psi, $P_{H2}$=0.5 psi, RH=65-75%. PEO/PMAA $P_{air}$=2.0 Psi, $P_{H2}$=0.5 psi, RH=55-88%. Temperature=22.5-24° C. Area of the electrode is 0.5 $cm^2$. Solid lines are guide to the eye FIG. 6 depicts (a) Potential (V) vs Current density (mA $cm^{-2}$) for LPEI/PAA Δ, PDAC/PAMPS ▲; PEO/PAA ○; (b) Corresponding power density plot for the same set of membranes. Conditions: LPEI/PAA $P_{air}$=2.0 psi, $P_{H2}$=0.5 psi, RH=55-75%. PDAC/PAMPS $P_{air}$=2.0 psi, $P_{H2}$=0.5 psi, RH=51-60%. PEO/PAA $P_{air}$=2.0 psi, $P_{H2}$=0.5 psi, RH=50-60%. Temperature=22.5-24° C. Area of the electrode is 0.5 $cm^{-2}$. Solid lines are guide to the eye.
Figure 5:
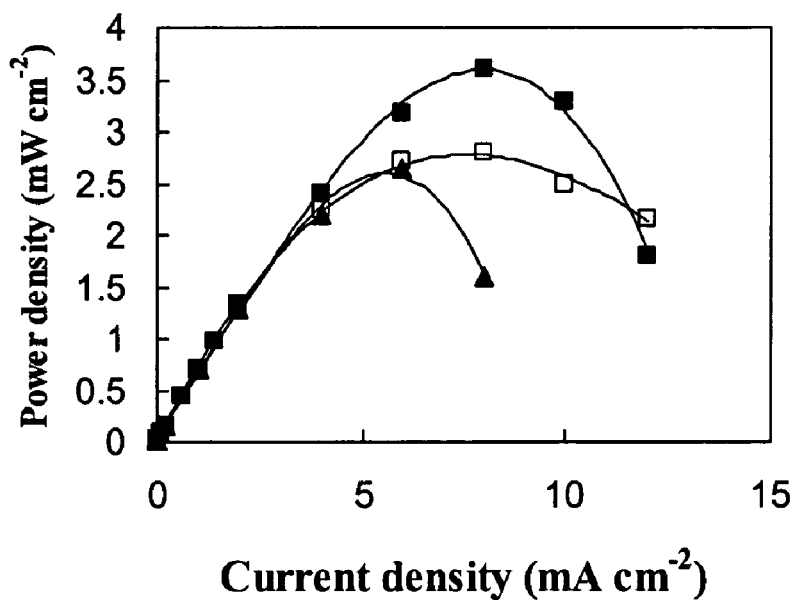
Figure 6:
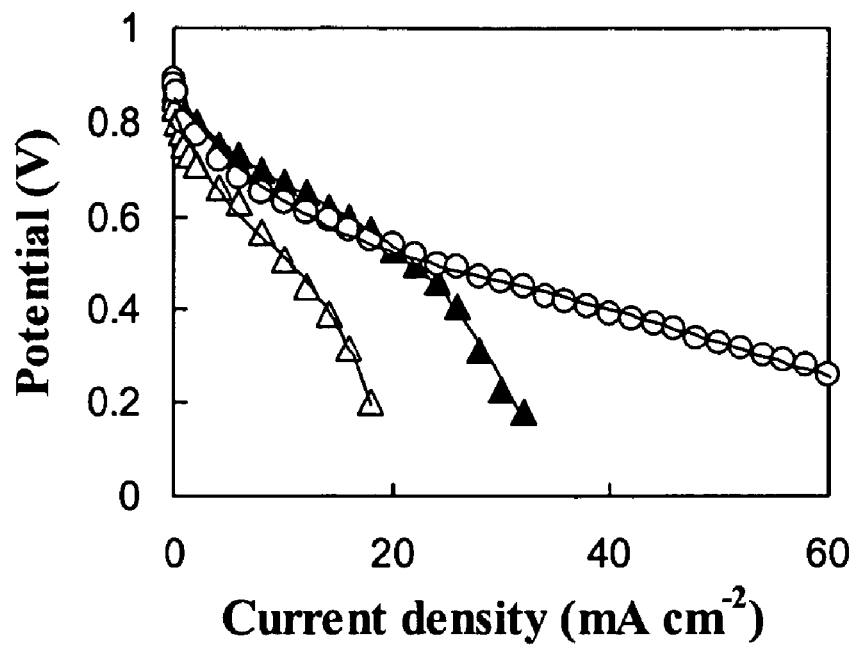
Figure 6:
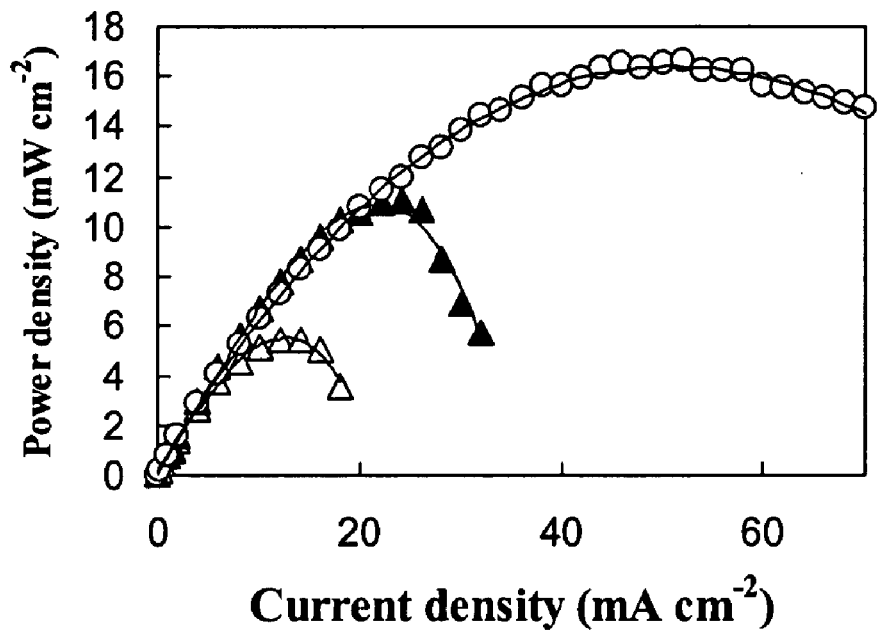

We have organized the LBL fuel cell systems into two categories where the low-power systems are shown in FIG. 5, and the high-power systems in FIG. 6. At ambient conditions, the low-power couples LPEI/PAMPS, LPEI/PSSM, PEO/

PMAA, and LPEI/PSS did not deliver an electrical power higher than 4 mWcm$^{-2}$, while the high power couples PDME/PAMPS, PDAC/PAMPS, LPEI/PAA, and PEO/PAA delivered greater than 5 mWcm$^{-2}$. By comparing the systems in FIG. 5 & FIG. 6 the effects of film structure and composition on the performance of the fuel cell can be discussed. Results in Table 1 show that MEAs containing different PE couples show different internal resistances, and in general, those that are less hydrophobic are more conductive to H$^+$. However, the hydrophilic-hydrophobic factor is not the only important factor, but the stability of the LBL film and the size of the polymer molecule may also play a role in power delivery. For example, wet LBL films of LPEI/PAA deposited on gold-coated substrates have a much higher conductivity than LPEI/PSS films ($5 \times 10^{-6}$ Scm$^{-1}$ >> $1.2 \times 10^{-8}$ Scm$^{-1}$). The difference is attributed to the higher hydrophilic character of PAA compared to PSS. One might assume that the conductivity of PSSM would therefore have an intermediate value of $0.9 \times 10^{-7}$ Scm$^{-1}$) as PSSM contains a mix of a 3:1 ratio of sulfonate to carboxylate groups. By referring to the power plots in FIG. 5 and FIG. 6, it is clear that the power delivered by the LPEI/PAA fuel cell (~5.5 mWcm$^{-2}$) is higher than that of LPEI/PSS (~3.0 mWcm$^{-2}$) for the reasons stated. Unexpectedly, the power delivered by the LPEI/PSSM system (0.16 mWcm$^{-2}$ at I=0.4 mA cm$^{-2}$) is not intermediate, but lower than that of the more hydrophobic LPEI/PSS. Although the LPEI/PSSM film is 2.5 times thicker than the LPEI/PSS film, this difference does not explain the 18.8 times difference in power density (i.e. 3.0:0.16 mWcm$^{-2}$). Both the LPEI and the PSSM polymer molecules possess a low average molecular weight that allows the PE couple to penetrate through the pores and form a few bilayers on the inner walls of the pore, and thus leading to greater resistance to proton mobility, and hence much lower power density.

Comparing LPEI/PAMPS (3.6 mWcm$^{-2}$), FIG. 5, and PDAC/PAMPS (~11.5 mWcm$^{-2}$), FIG. 6, the former couple might have been expected to produce more power because LPEI is more hydrophilic than PDAC. Under operating conditions PDAC/PAMPS showed a better performance probably because the LPEI/PAMPS film was viscous and unstable, allowing fuel cross over, and under the severe environment of the fuel cell, the film delaminated and leaked gases. The PDME/PAMPS (6.0 mWcm$^{-2}$, plot not shown) system was expected to perform better than PDAC/PAMPS because PDME is less hydrophobic than PDAC due to the presence of an OH group on the polymer backbone. However, it yielded a lower OCP (0.81 degrading to 0.64V) and a maximum power density of 6.0 mWcm$^{-2}$, similar to the LPEI/PAA system. In general, films that were suspected of fuel crossover yielded a low OCP. A PDME/PAMPS fuel cell operating at 0.46V and a current of 12.0 mAcm$^{-2}$ did not show any degradation in its voltage even after 30 minutes. The most stable couple among the low power LBL fuel cells was the LPEI/PSS system which after a few hours of operation kept delivering the initial power or even higher, up to 3.7 mWcm$^{-2}$.

Among the PE couples studied, the PEO/PAA system delivered the highest power (16.6 mWcm$^{-2}$), which was nearly 50% the performance of the E-TEK/Nafion112 fuel cell operated at RH>80% in our laboratory, and close to many commercial monocells at 20 mWcm$^{-2}$ operated under the same conditions. The PEO/PAA system is followed by the PDAC/PAMPS system at 11.6 mWcm$^{-2}$ and the LPEI/PAA system at ~5.5 mWcm$^{-2}$. The PDAC/PAMPS film had higher conductance than LPEI/PAA film because its thickness is nearly 2.5 times lower at an equivalent number of layers. All three systems were stable especially PEO/PAA that was tested, after a two hour experiment, by operating at half power for 10 minutes with hardly any change in potential. Additionally, the capability of the PEO/PAA system, as well as the other LBL fuel cell systems, to operate normally at RH=50% is a major advantage over the Nafion112® membrane used. For example, separate tests on the LPEI/PAA (5.5 mWcm$^{-2}$) and LPEI/PSS (3.7 mWcm$^{-2}$) fuel cell systems operated using a dry flow of H$_2$ and air at RH~5% were successfully performed. The significance of having the LBL film deposited on the Nucleopore platform and not directly on the ELAT electrodes was demonstrated when we tested an LBL PEO/PAA film directly deposited onto the ELAT electrodes, where the latter were separated by a composite membrane made up of only 10 bilayers of PEO/PAA. The power delivered by this system (1.84 mWcm$^{-2}$) was extremely low, and was attributed to the permeation and probably precipitation of the polyelectrolytes within the pores of the electrode during assembly, thus creating resistances within the electrodes to proton conductivity as well as a hydrophilic medium that absorbs water into the electrodes, blocking the passage of fuel. These early results indicate that the PEO/PAA system is a promising one for actual fuel cell applications.

Therefore, there are three important factors that determine the power performance of a PE-LBL fuel cell. To simplify, consider the three PE couples PDAC/PAMPS, PDAC/PSS, and LPEI/PSS. The PDAC/PSS couple ($\sigma < 10^{-9}$ S cm$^{-1}$) is characterized by a strong hydrophobic electrostatic interaction between the tertiary ammonium group [—N—$^+$] of PDAC and the sulfonate group [—SO$^{3-}$] of PSS leaving no stations for proton conduction across the PE segments. Farhat, T.; Yassin, G.; Dubas, S. T.; Schlenoff, J. B. Langmuir 1999, 15, 6621-6623; Dubas, S. T.; Schlenoff, J. B. Macromolecules 1999, 32, 8153-8160. As a result, no power was delivered by this system. Replacing the PDAC by LPEI with a polycation backbone that constitute secondary ammonium groups [—NH—$^+$] that are pH dependent and hydrophilic resulting in weaker interactions with the [—SO$^{3-}$] of PSS. Yoo, D.; Shiratori, S. S.; Rubner, M. F. 1998, 31, 4309-4318; Clark, S. L.; Hammond, P. T. Langmuir 2000, 16, 10206-10214. Consequently, proton exchange can progress moderately across the functional groups. When PDAC/PAMPS is compared to LPEI/PSS, the former delivers about 4 times the power even though both LBL films have the same thickness. Although, in PDAC/PAMPS there is a strong hydrophobic electrostatic interaction between the tertiary ammonium group [—N—$^+$] of PDAC and the sulfonate group [—SO$^{3-}$] of PAMPS; however, PAMPS differs from PSS in possessing the amide group [—CO—NH$_2$—] that is strongly hydrophilic. DeLongchamp, D. M.; Hammond, P. T. Chem. Mater. 2003, 15, 1165-1173. There is a possibility that the amide group acts as a sponge for the water generated at the cathode thus enriching the LBL film with water pools and channels across which the hydronium ions can propagate.

The impact of hydrophobicity clearly appears when comparing the PEO/PAA (16.6 mWcm$^{-2}$) and PEO/PMAA (2.64 mWcm$^{-2}$) fuel cell systems. The PEO/PAA film is nearly the same thickness as the PEO/PMAA film, yet the PEO/PAA system was capable of delivering a maximum electrical power around 16.6 mWcm$^{-2}$, which is 6 times higher than that of PEO/PMAA. The PMAA is more hydrophobic than PAA because it has an additional methyl group in its repeat unit. Among the PE couples studied, the PEO/PAA system delivered the highest power, which was nearly 50% the performance of the E-Tek/Nafion112 fuel cell operated in our laboratory, and close to many commercial monocells at 20 mWcm$^{-2}$ operated under the same conditions. However, the capability of the PEO/PAA system, as well as the other LBL fuel cell systems, to operate normally at RH=50% is a major advantage over the Nafion112 membrane. For example, separate tests on the LPEI/PAA (5.5 mWcm$^{-2}$) and LPEI/PSS (3.7 mWcm$^{-2}$) fuel cell systems operated using dry flow of H$_2$ and air at RH~5% were successfully performed. The significance of having the LBL film deposited on the Nucleopore and not directly on the ELAT electrodes was demonstrated when we tested an LBL PEO/PAA film directly deposited onto the ELAT electrodes, where the latter were separated by a composite membrane made up of only 10 bilayers of PEO/PAA in order to maintain continuity. The power delivered by this system (1.84 mWcm$^{-2}$) was low, and was attributed to the permeation of the polyelectrolytes within the pores of the electrode during assembly, thus creating large resistances within the electrodes to proton conductivity.

In terms of power delivery, the PEO/PAA system is followed by the PDAC/PAMPS system at 11.6 mWcm$^{-2}$ and the LPEI/PAA system at ~5.5 mWcm$^{-2}$. The PDAC/PAMPS film had higher conductance than LPEI/PAA film because its thickness is nearly 2.5 times less, although FTIR showed that both films have similar water content by referring to the OH stretch at 3500 cm$^{-1}$. Most of the fuel cell systems were operated for at least two hours before a complete shut down. Repetitive isolation of the FC from its load did not affect its performance. The average time taken for the FC to regain its OCP or an operating voltage when switched on was one minute. Our simple design did not use serpentine bipolar plates that allow intimate flow of gases close to the electrodes to increase efficiency and remove water; therefore, after prolonged operation, a disassembled MEA was found flooded with water between the composite membrane and the cathode. Moreover, the Nucleopore membrane had performed its role in providing support to the LBL film, but the thermal and mechanical stability of these polycarbonate membranes are less than optimal. In the fuel cell module, the Nucleopore membrane is subjected to some compression and excessive heat that in a number of fuel cell samples caused cracks in the "composite membrane." Different support membranes with more optimal mechanical and thermal properties and different pore structures are currently being investigated in this work.

IIIb. Devices—Soft Polymer Electrolyte Fuel Cells (SPEFC)

Figure 7:
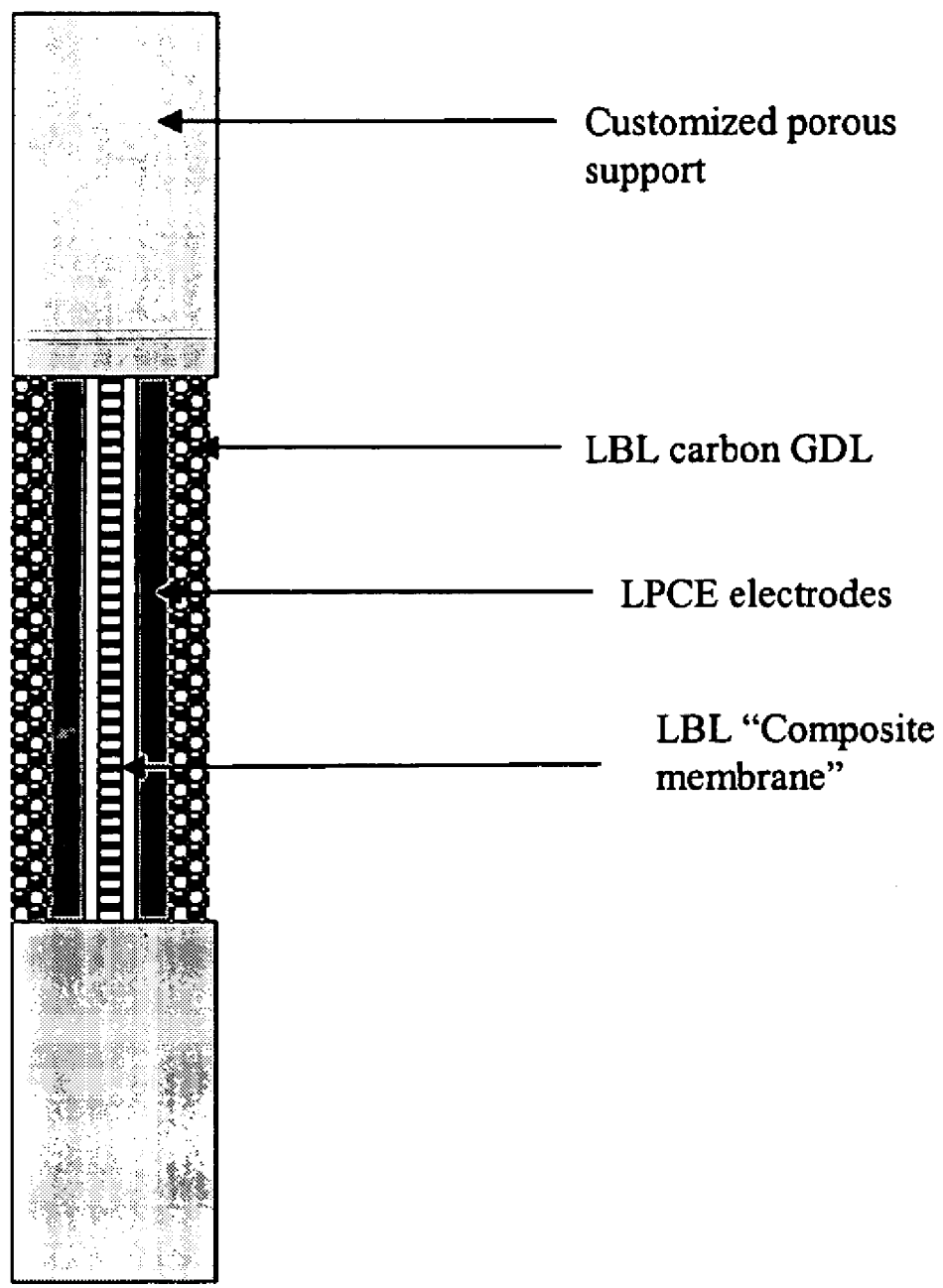
FIG. 7 depicts a soft fuel cell assembled on an insulating customized porous support.

Unlike conventional PEFCs, where the MEA is fabricated by hot pressing, the MEA of a "soft-PEFC" is synthesized in one process that does not require hot pressing and gasketing (if the membrane and the electrodes are separate). Using an automated dipper, the process starts by alternately dipping a customized porous-insulating support, FIG. 7, in poly(+)/poly(-) solutions until the required IEM thickness is assembled. The solutions that make up the IEM can then be replaced by the electrode colloidal suspensions to deposit the cathode and the anode. The electrode colloidal suspensions are in turn replaced by the "gas diffusion layer" colloidal suspensions to deposit the GDL. If a metallic film, acting as a current collector, can now be applied on both sides by sputtering or spraying then a complete soft fuel cell is assembled. Apart from the metallic contacts, we have discovered the above experimental procedure for soft fuel cell assembly.

There were no limitations on the soft fuel cell assembly when strong polyelectrolytes (i.e. pH independent such as PDAC, PAMPS) were used through out the process. However, if weak polyelectrolytes (i.e. pH dependent such as LPEI, PAA, PAA-co-PAAm) were used to assemble the IEM, then the pH of the carbon colloidal suspension should not exceed 4. For example, carbon colloidal suspensions of PDAC/ PAMPS maintained at pH=11 cannot be used to deposit LPCEs on an LPEI/PAA or PEO/PAA membranes that break down at pH>4. In this case, carbon colloidal suspensions of either PDAC/PAA-co-PAAm or LPEI/PAA maintained at pH=4 can be successfully used.

Figure 8:
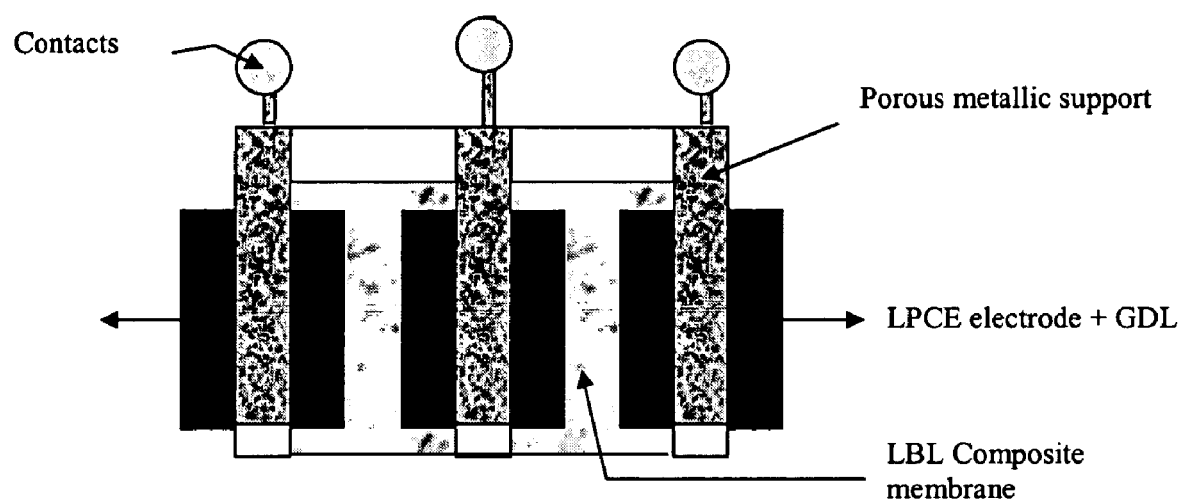
FIG. 8 depicts an electrode-catalyst layer atop of the GDL.
Figure 9:
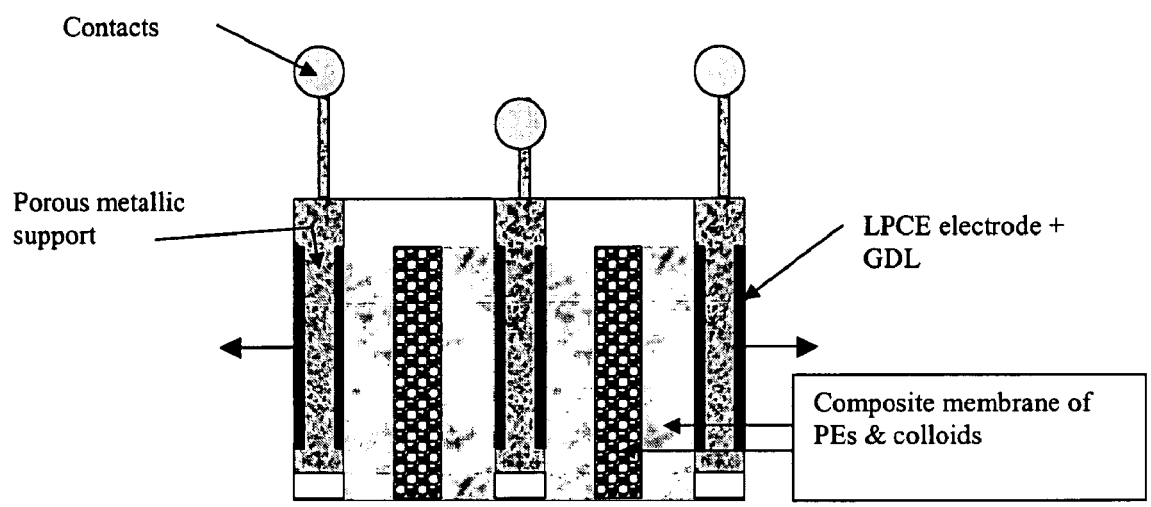
FIG. 9 depicts an electrode-catalyst layer within the GDL and the LBL membrane contains a colloidal porous framework.

Soft fuel-cells can be stacked according to conventional gasketing methods when the soft fuel cells are assembled on insulating-porous supports. Alternatively, soft MEAs can be stacked on multiple insulated-porous-metallic supports that act as GDLs and current collectors. In this case, stacking does not involve any gasketing or mechanical parts and the whole stack of MEAs is assembled in one process. The LBL process starts with the support executing multiple dipping in the poly (-)/poly(+) slurry of the electrodes until the desired thickness is achieved. The thickness of the electrodes is determined by the power delivered, the size of the colloids, and the separation between the supports. After building the electrodes, the gap between the electrodes can be filled by an LBL film (with or without a colloidal layer that mimic the porous membrane). The whole stack can then be immersed in an ionomer and dried (e.g., Nafion117®) to fill any lose gaps for proton conduction. Finally, to insure tight seal against gas leakages the whole stack is dipped in a resin solution and dried. FIGS. 8 & 9 show a schematic of the soft stack design. In a third embodiment, soft MEAs can be stacked on top of each other by following the same procedure described above, but starting with a metallic support rather than an insulating porous support to form one complete fuel cell. Keeping the whole setup in position but reversing the dipping procedure (i.e. GDL, Electrodes, Membrane) two new soft fuel cells self assemble on the original. The process can be repeated to form a "soft fuel-cell stack". The whole stack can then be immersed in an ionomer and dried (e.g., Nafion117®) to fill any lose gaps for proton conduction. Finally, to insure tight seal against gas leakages the whole stack is dipped in a resin solution and dried.

IIIc. Devices—Soft Carbon-Polymer Galvanic Cells and Batteries (SCPGC)

Figure 10:
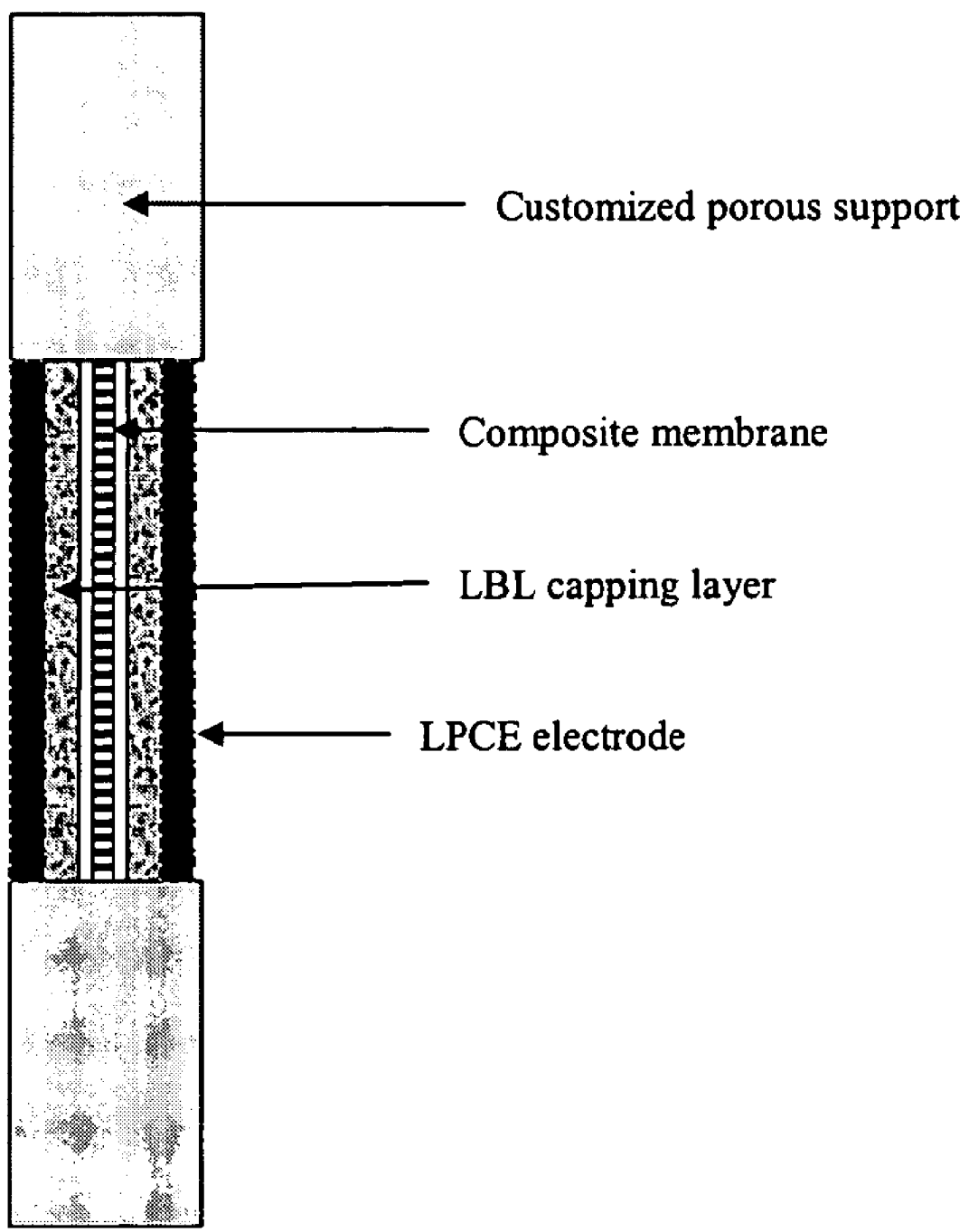
FIG. 10 is a schematic of a Soft Carbon-Polymer Galvanic cell.

The design of a soft fuel-cell can be adapted to design carbon-polymer based solid-state galvanic cells and batteries, FIG. 10. Unlike conventional types the SCPGC can be tailored to be ultra thin and extremely small (i.e. be applicable to micro-power systems). Also unlike conventional solid-electrolytes, in which only one type of ion (either cation or anion) is predominantly modile and conducts electivity, the membranes of the instant invention can be fabricated to conduct protons, cations and anions. In addition, since the LPCE possesses a large surface area, the MEA can be a potential candidate for state-of-art super-capacitors.

As with soft fuel-cells, the same type of composite membrane, part of the electrolyte phase, can be used as a separator or a salt bridge. The composite membrane is best assembled from water-soluble macromolecules (i.e. all types of polyelectrolytes e.g., LPEI/PAA, PEO/PAA, PAAm/PAA, PAAm/PAA-co-PAAm, PDAC/PAMPS, PDAC/PAA-co-PAAm) that possess high ionic conductivity. Since LBL films can be capped and stratified, a half-cell can be assembled by depositing a suitable polyelectrolyte couple (e.g., LPEI/PSS) directly onto the electrode then dosing the film with the required salt ion such as $CuSO_4$, $NH_4Cl$, and $ZnCl_2$.

LPCE electrodes can be of the inert (insoluble) type where the carbon electrodes are pure or embedded with noble metals, such as platinum, palladium, and gold. Both types of electrodes were assembled. The LPCE electrodes can also be of the active (soluble) type embedded with metal colloids such as copper, zinc, and silver or salt colloids such as $PbO_2$, and $MnO_2$ which allows it to generate electricity.

IIId. Devices—Soft Carbon-Polymer Electrochemical Cell (SCPEC)

The design of a soft fuel-cell can be adapted to design carbon-polymer based solid-state electrochemical cells. An electrochemical cell is used to monitor electrochemical processes by allowing currents to pass through rather than generating them. The major difference from the SCPFC is to have a passage for electrolytic solutions through the porous support in order to dose the analytical cell. Unlike conventional types, the SCPEC can be tailored to be ultra thin and extremely small (i.e. application to micro-electro-analytical systems) thus a potential candidate for state-of-art detectors. As with the fuel cell, the composite membrane is best assembled from water-soluble macromolecules (i.e. all types of polyelectrolytes e.g., LPEI/PAA, PEO/PAA, PAAm/PAA, PAAm/PAA-co-PAAm, PDAC/PAMPS, PDAC/PAA-co-PAAm) that possess high ionic conductivity. One of the LPCE electrodes must be of the inert (insoluble) type to represent the counter electrode. The LPCE counter electrode can be pure graphite colloid or graphite colloid embedded with noble metals such as platinum, palladium, and gold. For the working electrode the LPCE electrodes can be either inert or active (soluble) type where the graphite colloid is embedded with metal colloids, such as copper, zinc, or silver.

IIIe. Devices—Micro-Electrochemical Systems

Unlike conventional electrochemical systems, such as electrochemical cells, fuel cells, and galvanic cells the LBL electrochemical systems can be miniaturized using methods such as micro-contact-printing. Conventional microfuel cells made using expensive lithographic techniques still need a relatively large PEM to separate the microelectrodes. Holladay, J. D.; Jones, E. O.; Phelps, M.; Hu, J. J. Power Sources 2002, 108, 21-27.; Lee, S. J.; Chang-Chien, A.; Cha, S. W.; O'Hayre, R.; Park, Y. I.; Saito, Y.; Prinz, F. B. J. Power Sources 2002, 112, 410-418.; Maynard, H. L.; Meyers, J. P. J. Power Sources 2002, 109, 76-88. Therefore, it would be difficult to assemble a single microfuel cell using lithography, a job that is made easy using the LBL technology.

Figure 11:
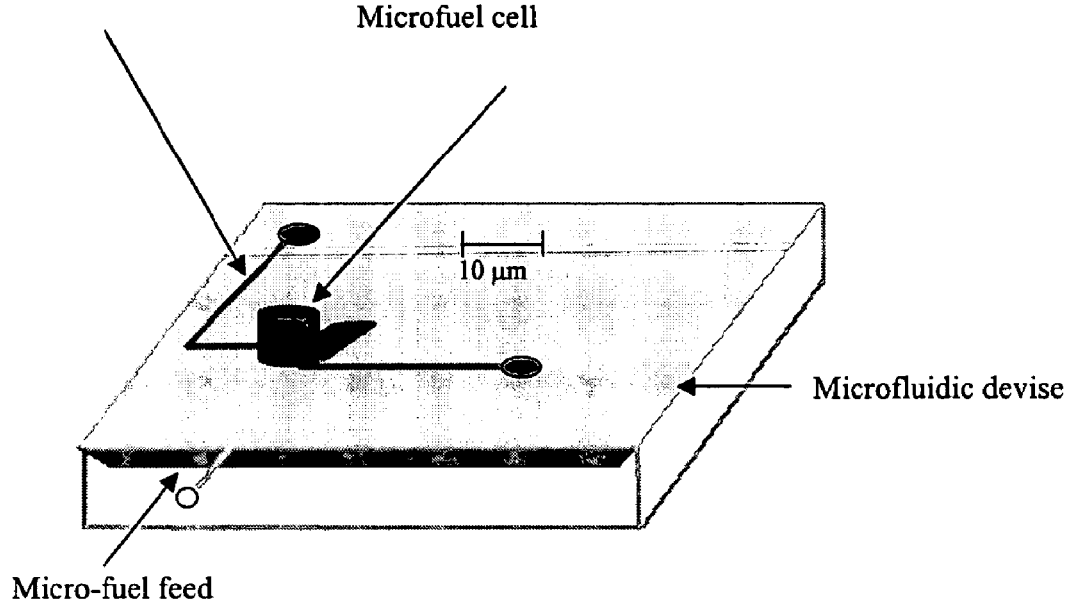
FIG. 11 depicts a miniature micro fuel-cell.

Polyelectrolyte carbon colloidal suspensions that make up the LPCE do not assemble well on hydrophobic or weakly bonding surfaces that prevent electrostatic interactions or hydrogen bonding. For example, a surface functionalized with long-chain alkyl thiols, weakly bonding polyelectrolyte, or hydrophobic polyelectrolytes prevents the deposition of carbon colloids at these sites. If part of the surface were treated with a suitable LBL film the LPCE would assemble over the LBL film only. On a micro-fluidic substrate a micron size electrochemical system can be assembled with its XY coordinates specified at a particular point on the surface provided that a channel allows the delivery of the electrolyte or the fuel, FIG. 11. For example, in the aqueous fuel-cell system described above, the liquid fuel can be easily delivered by capillary action through microfluidic channels.

IIIf. Devices—Catalytic Converters

Figure 12:
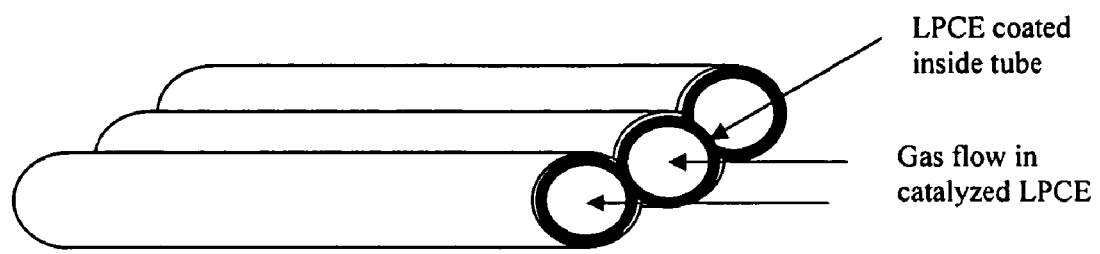
FIG. 12 is a sketch of a small part of a catalytic converters.
Figure 13:
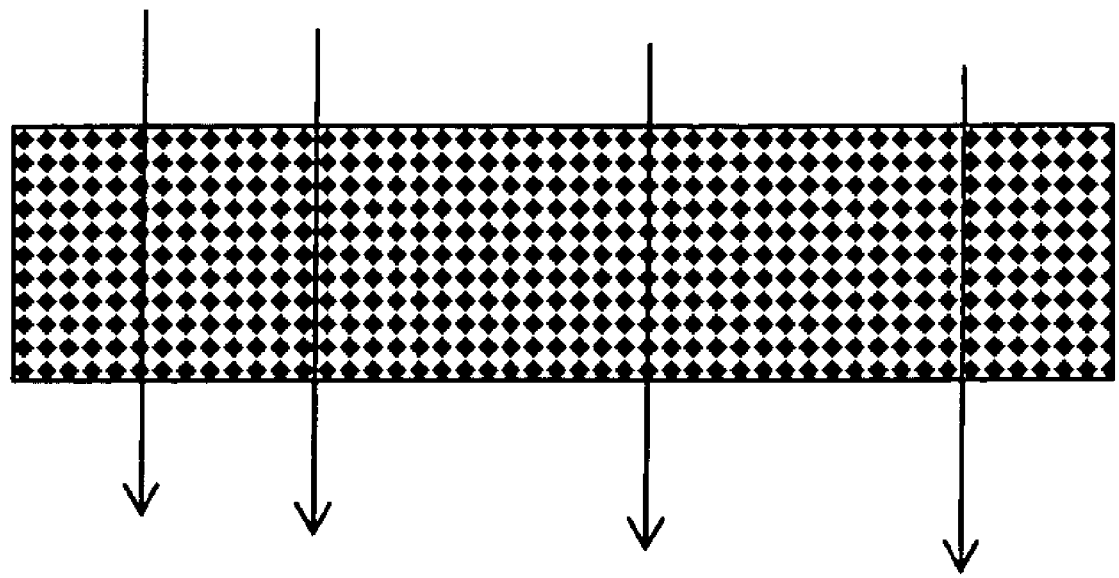
FIG. 13 depicts a thick, highly porous LPCE built on a porous membrane.

The ability to choose the required particle size of the catalyst (i.e. platinum or any suitable metal plus its carbon support) as well as the size of the polymer (i.e. the appropriate molecular weight) can be utilized to fabricate catalytic converters. The polymer/carbon LBL films can either be deposited on a porous framework with longitudinal tubes, FIG. 12. Or the LPCE can be built thick and porous enough in order to allow the porosity of the particles to mimic the porous support usually used in catalytic converters, FIG. 13. For example, a 40 bilayer LPCE of PDAC/PAMPS 10% platinum on activated carbon was successfully deposited on a porous Nucleopore® support with a thickness up to 30 μm.

IIIg. Devices—Other Applications

A solid state hydrogen pump has all of the same problems as a fuel cell, without the presence of a water forming reaction at the cathode. As with a fuel cells, eliminating the need for a humidifier will lead to a smaller, simpler, and lighter system.

An electrolyzer, especially one designed to produce hydrogen and oxygen from water offers a different set of problems. A water electrolyzer contains essentially the same parts as a fuel cells but the polarity is reversed, as are all of the electrochemical reactions. Instead of generating electricity and water from hydrogen and oxygen, it produces hydrogen and oxygen from water and electricity.

In an electrolyzer there is always water present to keep the membrane hydrated. The problems arise in the electrodes and on the gas outlet side. Because liquid water is present in the same compartment that gas is being generated in, the gas outlet flow will nearly always be two phase with a large quantity of water being carried out with the gas.

A more fundamental problem arises in the electrodes. Since maximum current efficiency requires that liquid water be in contact with the membrane, at least one of the electrodes must be hydrophilic. While a hydrophilic electrode is best for the membrane, it tends to impede gas bubble formation and gas removal. If the water is supplied directly to the membranes fully hydrophobic electrodes could be used, to maintain efficient gas evolution.

These problems are further exacerbated in a regenerative fuel cell. Since a regenerative fuel cell by definition must operate in turn as both an electrolyzer and a fuel cell, using hydrophilic electrodes that produce effective operation in a liquid water environment for electrolyzer operation virtually guarantees electrode flooding during fuel cell operation. If operation with liquid water present in the electrode compartment can be avoided, then hydrophobic electrodes can function well in both modes.

One method that has previously been proposed for directly humidifying a proton exchange membrane is the inclusion of water conducting wicks as part of the membrane structure. While this method has some effectiveness, the amount of flow that can be achieved through the membrane is limited. A further drawback to the wicks is that they rely on wetting to promote flow. This precludes their use to introduce non-aqueous streams into the proton exchange membrane. In addition, the wicks act as filtering elements to remove any particles in the stream. This limits their use to systems with pure water, or where care is taken to prevent the solution from becoming saturated and beginning to precipitate.

Electrochemical water desalination or clean-up systems based on the electroosmosis occurring in a hydrogen pump has some additional difficulties other than those noted above for a simple hydrogen pump. This type of system uses the fact that every proton passing through the membrane carries water with it, typically about two water molecules per proton. In devices described previously, the hydrogen and water to be purified are fed into the cell together as a solution saturated with hydrogen. Since the solubility of hydrogen in water is low, the current density is limited to a relatively low value. A low current density produces a low water purification rate.

Definitions

For convenience, certain terms employed in the specification, examples, and appended claims are collected here.

The term "electrolyte" as used herein means any chemical compound that ionizes when dissolved.

The term "polyelectrolyte" as used herein means a polymeric electrolyte, such as polyacrylic acid.

The term "pH" as used herein means a measure of the acidity or alkalinity of a solution, equal to 7, for neutral solutions and increasing to 14 with increasing alkalinity and decreasing to 0 with increasing acidity.

The term "pH dependent" as used herein means a weak electrolyte or polyelectrolyte, such as polyacrylic acid, in which the charge density can be adjusted by adjusting the pH.

The term "pH independent" as used herein means a strong electrolyte or polyelectrolyte, such as polystyrene sulfonate, in which the ionization is complete or very nearly complete and does not change appreciably with pH.

The term "$K_a$" as used herein means the equilibrium constant describing the ionization of a weak acid.

The term "$pK_a$" as used herein means a shorthand designation for an ionization constant and is defined as $pK_a = -\log K_a$. $pK_a$ values are useful when comparing the relative strength of acids.

The term "multilayer" as used herein means a structure comprised of two or more layers.

For purposes of this invention, the chemical elements are identified in accordance with the Periodic Table of the Elements, CAS version, Handbook of Chemistry and Physics, 67th Ed., 1986-87, inside cover.

The following are selected polymers used in the multilayer depositions of the present invention:

| Polymer Name | Polymer Abbreviation | Polymer Structure | Charge/pH dependent or independent |
|---|---|---|---|
| Polyacrylic acid | PAA | 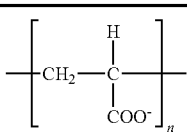 | Anionic/ pH dependent |
| Polyallylamine hydrochloride | PAH | 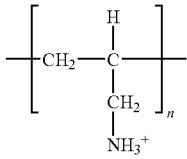 | Cationic/ pH dependent |
| Polyacrylamide | PAAm | 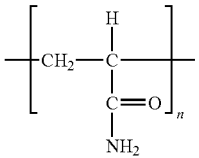 | Neutral |
| Polymethacrylic acid | PMA | 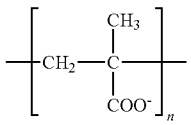 | Anionic/ pH dependent |
| Polystyrene sulfonate | SPS | 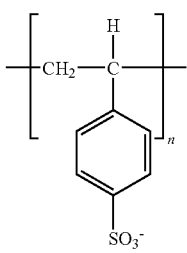 | Anionic/ pH independent |
| Polydiallyldimethyl-ammonium chloride | PDAC | 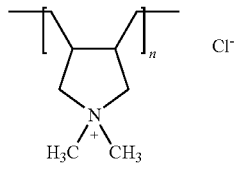 | Cationic/ pH independent |
| Linear Poly(ethyleneimine) | LPEI | 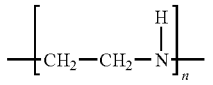 | Neutral |
| Poly(ethyleneoxide) | PEO | 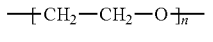 | Neutral |

-continued

| Polymer Name | Polymer Abbreviation | Polymer Structure | Charge/pH dependent or independent |
|---|---|---|---|
| Poly(2-acrylamido-2-methyl-1-propane sulfonic acid) | PAMPS | (structure) | Anionic/ pH independent |
| Poly(vinylpyrrolidone) | PVP | (structure) | Neutral |
| Poly(vinylalcohol) | PVA | (structure) | Neutral |
| Poly(ethylene glycol) | PEG | HO—[CH$_2$—CH$_2$—O]$_n$—H | Neutral |
| Poly(aniline) | PANI | (structure) | Neutral |
| Poly(styrene sulfonic acid-maleic acid, sodium salt) | PSSM3:1 | (structure) | Anionic/ pH dependent |
| Poly(acryl-co-acrylamide acid, sodium salt) | PAA-co-AAm | (structure) | Anionic/ pH dependent |
| Poly(dimethylamine-co-epichlorohydrin) | PDME | (structure) | Cationic/ pH independent |

Methods Of The Invention

The present invention also relates to a method of forming a membrane, comprising sequentially depositing, under pH controlled conditions, a plurality of polymer layers on a surface; wherein each polymer layer is independently selected from the group consisting of pH dependent cationic polyelectrolytes, pH independent cationic polyelectrolytes, neutral polymers, pH dependent anionic polyelectrolytes, and pH independent anionic polyelectrolytes; wherein a polymer layer optionally comprises at least one additional chemical entity selected from the group consisting of hydrogels, polyions, colloids, latexes, zeolites, platelets, proton sponges, organic molecules, organic salts, inorganic salts, organic acids, inorganic acids, cationic dendrimers, anionic dendrimers, metals and carbon; and wherein said plurality of polymer layers comprises a first polymer layer and second polymer layer; thereby forming a membrane.

The present invention also relates to the aforementioned method, wherein said membrane further comprises at least one additional chemical entity selected from the group consisting of hydrogels, polyions, colloids, latexes, zeolites, platelets, proton sponges, organic molecules, organic salts, inorganic salts, organic acids, inorganic acids, cationic dendrimers, anionic dendrimers, metals and carbon.

The present invention also relates to the aforementioned methods, wherein said first polymer layer is a pH dependent cationic polyelectrolyte, a pH independent cationic polyelectrolyte or a neutral polymer; and wherein said second polymer layer is a pH dependent anionic polyelectrolyte or pH independent anionic polyelectrolyte; and wherein said membrane is removed from said surface; thereby forming an ion-exchange membrane or a LBL polyelectrolyte-carbon electrode.

The present invention also relates to the aforementioned methods, wherein said first polymer layer is a pH dependent cationic polyelectrolyte, a pH independent cationic polyelectrolyte or a neutral polymer; and wherein said second polymer layer is a pH dependent anionic polyelectrolyte or pH independent anionic polyelectrolyte; and wherein said surface is selected from the group consisting of organic hydrophilic porous filter membranes and inorganic hydrophilic porous filter membranes; thereby forming an ion-exchange membrane.

The present invention also relates to the aforementioned methods, wherein said first polymer layer is a pH dependent cationic polyelectrolyte, a pH independent cationic polyelectrolyte or a neutral polymer; and wherein said second polymer layer is a pH dependent anionic polyelectrolyte or pH independent anionic polyelectrolyte; and wherein said membrane is removed from said surface; thereby forming an ion-exchange membrane or a LBL polyelectrolyte-carbon electrode.

The present invention also relates to the aforementioned methods, wherein said first polymer layer is a pH dependent cationic polyelectrolyte, a pH independent cationic polyelectrolyte or a neutral polymer; and wherein said second polymer layer is a pH dependent anionic polyelectrolyte or pH independent anionic polyelectrolyte; and wherein said surface is selected from the group consisting of organic hydrophilic porous filter membranes and inorganic hydrophilic porous filter membranes; thereby forming an ion-exchange membrane.

The present invention also relates to the aforementioned methods, wherein said first polymer layer is a pH dependent cationic polyelectrolyte, a pH independent cationic polyelectrolyte or a neutral polymer; and wherein said second polymer layer is a pH dependent anionic polyelectrolyte or pH independent anionic polyelectrolyte; and wherein said surface is organic, semi-metallic or metallic; and wherein said at least one additional entity is carbon; thereby forming a LBL polyelectrolyte-carbon electrode.

The present invention also relates to the aforementioned methods, wherein said first polymer layer is a pH dependent cationic polyelectrolyte, a pH independent cationic polyelectrolyte or a neutral polymer; and wherein said second polymer layer is a pH dependent anionic polyelectrolyte or pH independent anionic polyelectrolyte; and wherein said at least one chemical entity is selected from the group consisting of metals and inorganic salts; and wherein said at least on additional entity is carbon; thereby forming a LBL polyelectrolyte-carbon electrode.

The present invention also relates to the aforementioned methods, wherein said first polymer layer is selected from the group consisting of PAH, PDAC, PDME, PAAm, LPEI, PEO, PVP, PVA, PEG and PANI.

The present invention also relates to the aforementioned methods, wherein said first polymer layer is selected from the group consisting of PDAC, PDME, PAAm, LPEI and PEO.

The present invention also relates to the aforementioned methods, wherein said second polymer layer is selected from the group consisting of PAA, PMA, SPS, PAMPS, OEGDA, PSSM3:1, and PAA-co-PAA.

The present invention also relates to the aforementioned methods, wherein said second polymer layer is selected from the group consisting of PAA, PAMPS, SPS, PSSM3:1, PAA-co-PAAm.

The present invention also relates to the aforementioned methods, wherein said at least one chemical entity is selected from the group consisting of sulfonated latex, sodium chloride, potassium chloride, lithium chloride, sulfonic acid, nitric acid, hydrochloric acid, hydrobromic acid, phosphonic acid, PEG, OEGDA, PAAm, PVA, PVP, polyphosphates, Nafions®, ethylene glycol and glycerol.

The present invention also relates to the aforementioned methods, wherein said at least on chemical entity is selected from the group consisting of sodium chloride, sulfonated latex, and Nafion 117.

The present invention also relates to the aforementioned methods, wherein said first polymer layer is selected from the group consisting of PAH, PDAC, PDME, PAAm, LPEI, PEO, PVP, PVA, PEG and PANI; and wherein said at least one chemical entity is selected from the group consisting of sulfonated latex, sodium chloride, potassium chloride, lithium chloride, sulfonic acid, nitric acid, hydrochloric acid, hydrobromic acid, phosphonic acid, PEG, OEGDA, PAAm, PVA, PVP, polyphosphates, Nafions®, ethylene glycol and glycerol.

The present invention also relates to the aforementioned methods, wherein said second polymer layer is selected from the group consisting of PAA, PMA, SPS, PAMPS, OEGDA, PSSM3:1, and PAA-co-PAA; and wherein said at least one chemical entity is selected from the group consisting of sulfonated latex, sodium chloride, potassium chloride, lithium chloride, sulfonic acid, nitric acid, hydrochloric acid, hydrobromic acid, phosphonic acid, PEG, OEGDA, PAAm, PVA, PVP, polyphosphates, Nafions®, ethylene glycol and glycerol.

The present invention also relates to the aforementioned methods, wherein said first polymer layer is selected from the group consisting of PAH, PDAC, PDME, PAAm, LPEI, PEO, PVP, PVA, PEG and PANI; and wherein said second polymer layer is selected from the group consisting of PAA, PMA, SPS, PAMPS, OEGDA, PSSM3:1, and PAA-co-PAA; and wherein said at least one chemical entity is selected from the group consisting of sulfonated latex, sodium chloride, potassium chloride, lithium chloride, sulfonic acid, nitric acid, hydrochloric acid, hydrobromic acid, phosphonic acid, PEG, OEGDA, PAAm, PVA, PVP, polyphosphates, Nafions®, ethylene glycol and glycerol.

The present invention also relates to the aforementioned methods, wherein said first polymer layer is selected from the group consisting of PDAC, PDME, PAAm, LPEI and PEO; and wherein said at least on chemical entity is selected from the group consisting of sodium chloride, sulfonated latex, and Nafion 117.

The present invention also relates to the aforementioned methods, wherein said second polymer layer is selected from the group consisting of PAA, PAMPS, SPS, PSSM3:1, PAA-co-PAAm; and wherein said at least on chemical entity is selected from the group consisting of sodium chloride, sulfonated latex, and Nafion 117.

The present invention also relates to the aforementioned methods, wherein said first polymer layer is selected from the group consisting of PDAC, PDME, PAAm, LPEI and PEO; and wherein said second polymer layer is selected from the group consisting of PAA, PAMPS, SPS, PSSM3:1, PAA-co-PAAm; and wherein said at least on chemical entity is selected from the group consisting of sodium chloride, sulfonated latex, and Nafion 117.

The present invention also relates to the aforementioned methods, wherein said first polymer layer is LPEI.

The present invention also relates to the aforementioned methods, wherein said second polymer layer is a pH independent anionic polyelectrolyte.

The present invention also relates to the aforementioned methods, wherein said first polymer layer is PEO.

The present invention also relates to the aforementioned methods, wherein said second polymer layer is a pH dependent polyelectrolyte.

The present invention also relates to the aforementioned methods, wherein said first polymer layer is PAAm.

The present invention also relates to the aforementioned methods, wherein said second polymer layer is a pH dependent polyelectrolyte.

The present invention also relates to the aforementioned methods, wherein said first polymer layer is PDAC.

The present invention also relates to the aforementioned methods, wherein said second polymer layer is a pH dependent polyelectrolyte.

The present invention also relates to the aforementioned methods, wherein said second polymer layer is a pH independent polyelectrolyte.

The present invention also relates to the aforementioned methods, wherein said first polymer layer is PDME.

The present invention also relates to the aforementioned methods, wherein said second polymer is a pH independent polyelectrolyte.

The present invention also relates to the aforementioned methods, wherein said second polymer layer is PAMPS.

The present invention also relates to the aforementioned methods, wherein said first polymer layer is a neutral polymer.

The present invention also relates to the aforementioned methods, wherein said first polymer layer is a pH independent cationic polyelectrolyte.

The present invention also relates to the aforementioned methods, wherein said second polymer layer is SPS.

The present invention also relates to the aforementioned methods, wherein said first polymer layer is a neutral polymer.

The present invention also relates to the aforementioned methods, wherein said second polymer layer is PSSM3:1.

The present invention also relates to the aforementioned methods, wherein said first polymer layer is a neutral polymer.

The present invention also relates to the aforementioned methods, wherein said second polymer layer is PAA.

The present invention also relates to the aforementioned methods, wherein said first polymer layer is a neutral polymer.

The present invention also relates to the aforementioned methods, wherein said second polymer layer is PAA-co-PAAm.

The present invention also relates to the aforementioned methods, wherein said first polymer layer is a neutral polymer.

The present invention also relates to the aforementioned methods, wherein said first polymer is a pH independent cationic polymer.

The present invention also relates to the aforementioned methods, wherein the first polymer layer is LPEI; and wherein the second polymer layer is PAMPS.

The present invention also relates to the aforementioned methods, wherein the first polymer layer is LPEI; and the wherein the second polymer layer is SPS.

The present invention also relates to the aforementioned methods, wherein the first polymer layer is LPEI; and wherein the second polymer layer is PSSM.

The present invention also relates to the aforementioned methods, wherein the first polymer layer is LPEI; and wherein the second polymer layer is PAA.

The present invention also relates to the aforementioned methods, wherein the first polymer layer is PEO; and wherein the second polymer layer is PAA.

The present invention also relates to the aforementioned methods, wherein the first polymer layer is PAAm; and wherein the second polymer layer is PAA.

The present invention also relates to the aforementioned methods, wherein the first polymer layer is PAAm; and wherein the second polymer layer is PAA-coPAAm.

The present invention also relates to the aforementioned methods, wherein the first polymer layer is PDAC; and wherein the second polymer layer is PAA-co-PAAm.

The present invention also relates to the aforementioned methods, wherein the first polymer layer is PDAC; and wherein the second polymer layer is PAMPS.

The present invention also relates to the aforementioned methods, wherein the first polymer layer is PDME; and wherein the second polymer layer is PAMPS.

The present invention also relates to the aforementioned methods, wherein the PAA is deposited at a pH of about 4.0.

The present invention also relates to the aforementioned methods, wherein the PAA is deposited at a pH between about 3.5 and about 4.5.

The present invention also relates to the aforementioned methods, wherein the PAA is deposited at a pH of about 2.0.

The present invention also relates to the aforementioned methods, wherein the PAA is deposited at a pH of about 2.5.

The present invention also relates to the aforementioned methods, wherein the PAA is deposited at a pH between about 1.5 and about 3.0.

The present invention also relates to the aforementioned methods, wherein the PAA-co-PAAm is deposited at a pH of about 2.0.

The present invention also relates to the aforementioned methods, wherein the PAA-co-PAAm is deposited at a pH between about 1.5 and about 2.5.

The present invention also relates to the aforementioned methods, wherein the PAA-co-PAAm is deposited at a pH of about 5.

The present invention also relates to the aforementioned methods, wherein the PAA-co-PAAm is deposited at a pH between about 4.5 and about 5.5.

The present invention also relates to the aforementioned methods, wherein the PAA-co-PAAm is deposited at a pH between about 5.5 and about 6.5.

The present invention also relates to the aforementioned methods, wherein the PAA-co-PAAm is deposited at a pH between about 6.5 and about 7.5.

The present invention also relates to the aforementioned methods, wherein said surface is selected from the group consisting of carbon cloth, porous stainless steel, porous silicon, porous titanium alloys and gold.

The present invention also relates to the aforementioned methods, wherein said carbon is selected from the group consisting of carbon powder, aqueous carbon paste, and Hispec3000 powder.

The present invention also relates to the aforementioned methods, wherein said metal is selected from the group consisting of Pd, Pt, Au, Ru, Zn, Cu, Ag and Al.

The present invention also relates to the aforementioned methods, wherein said first polymer layer is PDAC; and wherein said second polymer layer is PAMPS; and wherein said carbon is carbon powder; and wherein said metal is Pd.

The present invention also relates to the aforementioned methods, wherein said first polymer layer is PDAC; and wherein said second polymer layer is PAMPS; and wherein said carbon is Hispec 3000; and wherein said metal is Pt.

The present invention also relates to the aforementioned methods, wherein said first polymer layer is LPEI; and wherein said second polymer layer is PAA deposited at a pH of about 4.0; and wherein said carbon is aqueous carbon paste; and wherein said metal is Pt.

The present invention also relates to a membrane, comprising a plurality of polymer layers held together by electrostatic or hydrogen bonding interactions, wherein said membrane has a total uniform thickness of less than about 10 µm and a conductance of less than about $1.0 \times 10^{-3}$ S/cm and this conductance does not degrade over time.

The present invention also relates to the aforementioned membrane, wherein said membrane has a total thickness of less than about 1 µm.

The present invention also relates to the aforementioned membranes, wherein said membrane has a total thickness of less than about 0.75 µm.

The present invention also relates to the aforementioned membranes, wherein said membrane has a total thickness of less than about 0.5 µm.

The present invention also relates to the aforementioned membranes, wherein said membrane has a total thickness of less than about 0.25 µm.

The present invention also relates to the aforementioned membranes, wherein said membrane has a total thickness of less than about 0.1 µm.

The present invention also relates to the aforementioned membranes, wherein said membrane has a conductance of less than about $5.0 \times 10^{-4}$ S/cm.

The present invention also relates to the aforementioned membranes, wherein said membrane has a conductance of less than about $2.0 \times 10^{-4}$ S/cm.

The present invention also relates to the aforementioned membranes, wherein said membrane has a conductance of less than about $5.0 \times 10^{-5}$ S/cm.

The present invention also relates to the aforementioned membranes, wherein said membrane has a conductance of less than about $2.0 \times 10^{-5}$ S/cm.

The present invention also relates to the aforementioned membranes, wherein said membrane has a conductance of less than about $5.0 \times 10^{-6}$ S/cm.

The present invention also relates to the aforementioned membranes, wherein said membrane has a conductance of less than about $1.0 \times 10^{-6}$ S/cm.

The present invention also relates to the aforementioned membranes, wherein the first polymer layer is LPEI; and wherein the second polymer layer is PAMPS.

The present invention also relates to the aforementioned membranes, wherein the first polymer layer is LPEI; and the wherein the second polymer layer is SPS.

The present invention also relates to the aforementioned membranes, wherein the first polymer layer is LPEI; and wherein the second polymer layer is PSSM.

The present invention also relates to the aforementioned membranes, wherein the first polymer layer is LPEI; and wherein the second polymer layer is PAA.

The present invention also relates to the aforementioned membranes, wherein the first polymer layer is PEO; and wherein the second polymer layer is PAA.

The present invention also relates to the aforementioned membranes, wherein the first polymer layer is PAAm; and wherein the second polymer layer is PAA.

The present invention also relates to the aforementioned membranes, wherein the first polymer layer is PAAm; and wherein the second polymer layer is PAA-coPAAm.

The present invention also relates to the aforementioned membranes, wherein the first polymer layer is PDAC; and wherein the second polymer layer is PAA-co-PAAm.

The present invention also relates to the aforementioned membranes, wherein the first polymer layer is PDAC; and wherein the second polymer layer is PAMPS.

The present invention also relates to the aforementioned membranes, wherein the first polymer layer is PDME; and wherein the second polymer layer is PAMPS.

The present invention also relates to the aforementioned membranes, wherein said membrane can be used as an ion-exchange membrane, a gas diffusion membrane or an electrode.

The present invention also relates to the aforementioned membranes, wherein the said membrane can be used in a membrane-electrode assembly, a battery, a galvanic cell, an electrochemical cell, a micro-electrochemical cell, a catalytic converter, a solid-state hydrogen pump, an electrolyzer, or an electrochromic device.

EXEMPLIFICATION

The invention now being generally described, it will be more readily understood by reference to the following examples, which are included merely for purposes of illustration of certain aspects and embodiments of the present invention, and are not intended to limit the invention.

Example 1

Membrane Preparation

All polyelectrolytes used to fabricate the LBL films were used as received. Poly(styrene sulfonic acid, sodium salt) [PSS; MW=70,000], Poly(diallyldimethyl ammonium chloride) [PDAC; MW=240,000], Linear Poly(ethyleneimine) [LPEI; MW=25,000], Poly(acrylic acid) [PAA; MW=90,000], Poly(styrenesulfonic acid-maleic acid, sodium salt) [PSSM3:1; MW=20,000], Poly(ethylene oxide) [PEO; MW=4,000,000], Poly(methylacrylic acid) [PMAA; MW=100,000], Poly(acrylic-co-acrylamide acid, sodium salt) [PAAcoAAm, MW=10,000,000 40% carboxy], all from Polysciences Inc. Poly(2-acrylamido-2-methyl-1-propane sulfonic acid) [PAMPS; MW=2,000,000], Poly(dimethylamine-co-epichlorohydrin) [PDME], and Polyaniline (Emarlidine base) [PAN, MW=100,000], from Aldrich. Nafion117 as a 5% resin solution from Fluka. Sodium chloride from Mallinckrodt C.P., Sulfuric acid 98%, Nitric acid 96.6%, 30% hydrogen peroxide from Fischer.

Nucleopore® membranes (25 mm diameter) were from SPI supplies. Nafion112® from DuPont, and ELAT® C/Pt electrodes (~0.5 mg platinum loading) from E-Tek Inc.; Profilometer from Tencore Ins. Type P-10, Scanning electron microscope (SEM) JOEL 5910 and an environmental SEM (XL30 FEG-ESEM) for non-conducting polymer samples, EG&G Princeton Applied Research potentiostat model 276, AC Impedance Solartron Inc. type SI 1260, plasma cleaner/sterilizer PDC-32G, Nicolet 550 SeriesII FTIR.

The track etched Nucleopore® membrane with 0.1 μm pores and $3\times10^8$ pore density was plasma etched for 90 seconds. A positively charged layer of PDAC was first deposited to prepare the porous membrane for multilayer deposition. For the entire PE couples used 40 bilayers were deposited using an automated ZEISS DS50 dipper. Whether the LBL film was deposited on a Nucleopore or a Si-100 wafer the thickness of the composite membrane or the LBL film was determined using a profilometer and characterized by FTIR. The Nucleopore membrane is fairly transparent to IR (around 75% transmission peak-to-peak on the interferogram window).

Example 2

Fuel Cell Assembly

The "composite membranes" were soaked in 20.0 mM sulfuric acid solution for 20 minutes then placed on permanox slides ready to be folded between the ELAT C/Pt electrodes. All the "composite membranes", including the Nafion112, were moderately hand pressed to the electrodes at room temperature. The untreated electrodes were twice soaked in 2.5% Nafion117 solution for 15 minutes and oven dried at 90° C. for 3 minutes.

The Nafion112® was pretreated by heating at 80° C. with 2% $H_2O_2$ solution for 2 hours followed by rinsing with Milli-Q pure water. The Nafion membrane was then soaked in a 0.5M sulfuric acid solution for two days and then boiled in 20 mM sulfuric acid solution for 1 hour before storing in pH=$1.7H_2SO_4$ solution. Slade, S.; Campbell, S. A.; Ralph, T. R.; Walsh, F. C. J. Electrochem. Soc. 2002, 149, A1556-A1564.

The MEA was fitted inside a fuel cell module that acts as bipolar plates but with no serpentine channels that provide intimate fuel flow. The module was enclosed in a homemade two-chamber manifold where the pressures of air and hydrogen (BOC grade) were monitored and adjusted using digital pressure gauges ACSI from McMaster-Carr Supply Company. The temperature and humidity in the $H_2$ chamber were monitored using a MASTECH MS6503 humidity-temperature meter. Pressures were never taken above 10 psi and glass humidifiers in a water bath thermostat were used.

The power delivered by the cell had its cathode connected to the working electrode terminal while the anode was connected to both the reference and the counter electrodes. Measurements were made using the EG&G 276 software that dials a particular current in the galvanostat mode in order to measure the corresponding potential as a function of time. Measurements were checked against resistive loads using an ammeter and a voltmeter.

EQUIVALENTS & INCORPORATION BY REFERENCE

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

We claim

1. A method of forming an electrically conductive membrane comprising:
    sequentially depositing, under pH controlled conditions, a mixture of a colloid and a charged polymer on a surface to form a plurality of layers comprising a first layer and a second layer; wherein
    the surface is a porous surface;
    said first layer is deposited from a mixture of a first colloid and a first polymer selected from the group consisting of polyallylamine hydrochloride, polydiallyldimethylammonium chloride, poly(dimethylamine-co-epichlorohydrin), linear poly(ethyleneimine), and poly(aniline);
    said second layer is deposited from a mixture of a second colloid and a second polymer selected from the group consisting of polyacrylic acid, polymethacrylic acid, polystyrene sulfonate, poly(2-acrylamido-2-methyl-1-propane sulfonic acid), oligoethylene glycol dicarboxylic acid, poly(styrene sulfonic acid-maleic acid), and poly(acryl-co-acrylamide acid);
    said first colloid consists essentially of a carbon powder, a metal or a combination thereof; and
    said second colloid consists essentially of a carbon powder, a metal or a combination thereof.

2. The method of claim 1, further comprising the step of removing said electrically conductive membrane from said porous surface.

3. The method of claim 1, wherein said porous surface is organic, semi-metallic or metallic.

4. The method of claim 1, wherein said first polymer is selected from the group consisting of polydiallyldimethylammonium chloride, linear poly(ethyleneimine), and poly(aniline).

5. The method of claim 1, wherein said second polymer is selected from the group consisting of polyacrylic acid, polystyrene sulfonate, poly(2-acrylamido-2-methyl-1-propane sulfonic acid), and poly(acryl-co-acrylamide acid).

6. The method of claim 1, wherein said second polymer is poly(2-acrylamido-2-methyl-1-propane sulfonic acid).

7. The method of claim 3, wherein said porous surface is selected from the group consisting of metal, carbon cloth, porous stainless steel, porous silicon, porous titanium alloys and gold.

8. The method of claim 1, wherein said first polymer is poly(aniline).

9. The method of claim 1, wherein said plurality of layers comprises a plurality of first layers and a plurality of second layers; and said first layers are deposited in an alternating fashion with said second layers.

10. The method of claim 1, wherein said first colloid is made charged by said first polymer.

11. The method of claim 1, wherein said second colloid is made charged by said second polymer.

12. The method of claim 1, wherein the porous surface is conductive.

* * * * *